US009961025B2

(12) United States Patent
Butler et al.

(10) Patent No.: US 9,961,025 B2
(45) Date of Patent: May 1, 2018

(54) METHOD AND SYSTEM THAT STREAMS REAL-TIME, PROCESSED DATA FROM REMOTE PROCESSOR-CONTROLLED APPLIANCES

(71) Applicant: Oracle America, Inc., Redwood Shores, CA (US)

(72) Inventors: Eric Butler, Portland, OR (US); Andrew Psaltis, Littleton, CO (US); Sean McNamara, Lehi, UT (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 886 days.

(21) Appl. No.: 13/868,269

(22) Filed: Apr. 23, 2013

(65) Prior Publication Data

US 2013/0290450 A1     Oct. 31, 2013

Related U.S. Application Data

(60) Provisional application No. 61/640,653, filed on Apr. 30, 2012.

(51) Int. Cl.
*H04L 12/58* (2006.01)
*H04L 12/18* (2006.01)
(Continued)

(52) U.S. Cl.
CPC ........ *H04L 51/04* (2013.01); *G06Q 30/0201* (2013.01); *H04L 12/1859* (2013.01); *H04L 67/2838* (2013.01); *H04L 67/2885* (2013.01)

(58) Field of Classification Search
CPC . H04L 51/04; H04L 12/1859; H04L 12/1895; G06Q 10/101; G06Q 30/0201;
(Continued)

(56) References Cited

U.S. PATENT DOCUMENTS 7,181,412 B1    2/2007  Fulgoni et al.
8,359,389 B1 *  1/2013  Cohen ................... H04W 4/20
                                                        705/23
(Continued)

FOREIGN PATENT DOCUMENTS

WO    2002-17119 A2    2/2002
WO    2005-017753 A1   2/2005
(Continued)

*Primary Examiner* — Douglas Blair
*Assistant Examiner* — Christopher Cadorna
(74) *Attorney, Agent, or Firm* — Kilpatrick Townsend & Stockton LLP

(57) ABSTRACT

The current document is directed to systems and methods that stream real-time, processed data from remote processor-controlled user appliances, including personal computers, tablets, mobile phones, and laptops, to application programs for display, analysis, and other purposes and to other data-consuming devices and systems. In one implementation, a real-time processed-data streaming system includes instrumentation within remote, processor-controlled user devices, data collection at geographically distributed data-collection centers, consolidation of event messages generated by the geographically distributed data-collection centers within consolidation systems, processing of the consolidated event messages within one or more processing centers, and streaming of processed data, in the form of various types of processed-data-containing messages, to consumers of the data, including application programs that render the data for display on electronic display devices.

19 Claims, 35 Drawing Sheets

(51) Int. Cl.
*G06Q 30/02* (2012.01)
*H04L 29/08* (2006.01)

(58) Field of Classification Search
CPC .......... G06Q 30/0203; G06F 2201/875; G06F 9/542; G06F 11/3438; G06F 2201/86; G06F 2201/865
See application file for complete search history.

(56) References Cited

U.S. PATENT DOCUMENTS

| | | | |
|---|---|---|---|
| 2005/0027676 A1* | 2/2005 | Eichstaedt | G06F 9/542 |
| 2006/0212514 A1* | 9/2006 | Saillet | G06F 17/30861 709/203 |
| 2010/0198636 A1* | 8/2010 | Choudhary | G06F 21/552 705/7.28 |
| 2013/0262035 A1* | 10/2013 | Mills | G01D 9/005 702/188 |

FOREIGN PATENT DOCUMENTS

| | | |
|---|---|---|
| WO | 2008-008913 A2 | 1/2008 |
| WO | 2010-010586 A1 | 1/2010 |

\* cited by examiner

```
{
    "meta" :
    {
        "schema_version" : "2.0",
        "api_version" : "2.0",
        "message_type" : "event",
        "stream_type" : "content"
    },
    "data" :
    {
        "k1" : "xxxxxx",
        "k2" : "xxxxxx",
        "wt" :
        {
            "k3" : [ "xxxxxx", "xxxxxx"],
            "k4" : "xxxxxx",
            "k5" : [ "xxxxxx ", "xxxxxx", "xxxxxx"],
            "k6" : [ "xxxxxx"]
        }
    }
}
```

```
"meta" :                                    ⟋ 840
{
    "schema_version" : "2.0",
    "api_version" : "2.0",
    "message_type" : "event",
    "stream_type" : "content"
},
"data" :
{
    "k1" : "xxxxxx",        ⟋ 842
    "k2" : "xxxxxx",
    "wt" : "xxxxxx",
    {
        "k3" : [ "xxxxx" ],
        "k4" : "xxxxxx",
        "k5" : [ "xxxxxx", "xxxxxx", "xxxxxx" ],
    }
},
"ext" :
{                                           ⟋ 844
    "geo" :
    {
            "k20" : "xxxxxx",
846 ⟋       "k21" : "xxxxxx",
    },                :
    "device" :
    {
            "k30" : " xxxxxx",
848 ⟋       "k31" : " xxxxxx",
    },                :
    "browser" :
    {
            "k40" : "xxxxxx",
850 ⟋       "k41" : "xxxxxx",
    }
    }               :
}
```

FIG. 8C

```
{
    "meta" :                                          ← 860
    {
        "schema_version" : "2.0",
        "api_version" : "2.0",
        "message_type" : "xxxxxx",
        "stream_type" : "xxxxxx"
    },
    "session_id" : "1353515717173",           ⎫
    "visitor_id" : "216.64.169.240-4057458896.30216649",  ⎬  862
    "session_closed" : false,                  ⎭
    "session_summary" :
    {
        "events" :
864 ─→  {
            "k1" : "xxxxxx",
            "k2" : "xxxxxx"
        },
        "k10" :
        {
            "k11" : "xxxxxx",
            "k12" : "xxxxxx"
        },
        "k20"
        {
            "k21" : "xxxxxx"
        }                              ← 866
    },
    "events" : [
        {
```

FIG. 8D-1

```
"k30" : "xxxxxx",
        "k31" : ["xxxxxx", "xxxxxx", "xxxxxx"],
        "data" :
        {
            "k32" : ["xxxxxx", "xxxxxx", "xxxxxx"],
            "wt" :
            {
                "k33" : ["xxxxxx", "xxxxxx", "xxxxxx"],
                "k34" : ["xxxxxx", "xxxxxx", "xxxxxx"],
            }
        },
        "ext" :
        {
            "geo"
            {
                "k35" : ["xxxxxx", "xxxxxx", "xxxxxx"],
                "k36" : ["xxxxxx", "xxxxxx", "xxxxxx"]
            },
            "source" :
            {
                "k38" : ["xxxxxx", "xxxxxx", "xxxxxx"],
                "k39" : ["xxxxxx", "xxxxxx", "xxxxxx"]
            },
            "device":
            {
                "k41" : "xxxxxx", "xxxxxx", "xxxxxx"],
                "k42" : ["xxxxxx", "xxxxxx", "xxxxxx"]
            },
            "browser":
            {
                "k44" : ["xxxxxx", "xxxxxx", "xxxxxx"],
                "k45" : ["xxxxxx", "xxxxxx", "xxxxxx"]
            }
        }
    },
    {
```

FIG. 8D-2

```
"k50" : "xxxxxx",
    "k51" : ["xxxxxx", "xxxxxx", "xxxxxx"],
    "data" :
    {
        "k52" : ["xxxxxx", "xxxxxx", "xxxxxx"],
        "wt" :
        {
            "k53" : ["xxxxxx", "xxxxxx", "xxxxxx"],
            "k54" : ["xxxxxx", "xxxxxx", "xxxxxx"]
        }
    },
    "ext" :
    {
        "geo"
        {
            "k55" : ["xxxxxx", "xxxxxx", "xxxxxx"],
            "k56" : ["xxxxxx", "xxxxxx", "xxxxxx"]
        },
        "source" :
        {
            "k58" : ["xxxxxx", "xxxxxx", "xxxxxx"],
            "k59" : ["xxxxxx", "xxxxxx", "xxxxxx"]
        },
        "device":
        {
            "k61" : "xxxxxx", "xxxxxx", "xxxxxx"],
            "k62" : ["xxxxxx", "xxxxxx", "xxxxxx"]
        }
        "browser":
        {
            "k64" : ["xxxxxx", "xxxxxx", "xxxxxx"],
            "k65" : ["xxxxxx", "xxxxxx", "xxxxxx"]
        }
    }
}
]
}
```

FIG. 8D-3 select * ⸺ 1020 select event.data.wt.k1, event.data.wt.k2, . . . ⸺ 1022 select event.data.*, event.ext.geo.* ⸺ 1024 select session.visitor_id, session.time_on_site, session.events.* ⸺ 1026 where session.closed = 'true' where session.closed = 'true' AND session.session_summary.purchase.event_count = 0 ⸺ 1028

FIG. 10B

```
function WebTrends() { var that = this; this.dcsid =
"dcscyjdor000004fu02p6j55k_7z2q"; this.domain = "statse.webtrendslive.com";
this.timezone = -8; this.fpcdom = ".motorcycle-superstore.com";
this.onsitedoms = (function () { return (window.RegExp ? new
RegExp(".*motorcycle-superstore.com", "i") : ""); })();this.downloadtypes =
"xls,doc,pdf,txt,csv,zip"; this.navigationtag = "div,table"; this.adclickparam
= "WT.ac"; this.trackevents = true; this.trimoffsiteparams = true;
this.enabled = true; this.i18n = false; this.fpc = "WT_FPC";
this.paidsearchparams = "gclid"; this.splitvalue = ""; this.preserve = true;
this.vid = { params: "WT.dcsvid,WT.i_e_dcsvid", name: "WT_VID", path: ";
path=/", expiry: "; expires=" + (function () { var cur = new Date(); var exp =
new Date(cur.getTime() + 315360000000); return exp.toGMTString(); })(),
domain: "; domain=" + this.fpcdom }; this.DCS = {}; this.WT = {}; this.DCSext
= {}; this.images = []; this.index = 0; this.qp = []; this.exre = (function ()
{ return (window.RegExp ? new
RegExp("dcs(uri)|(ref)|(aut)|(met)|(sta)|(sip)|(pro)|(byt)|(dat)|(p3p)|(cfg)|(
redirect)|(cip)", "i") : ""); })(); this.re = (function () { return
(window.RegExp ? (that.i18n ? { "%25": /\%/g, "%26": /\&/g } : { "%09": /\t/g,
"%20": / /g, "%23": /\#/g, "%26": /\&/g, "%2B": /\+/g, "%3F": /\?/g,
"%5C": /\\/g, "%22": /\"/g, "%7F": /\x7F/g, "%A0": /\xA0/g }) : ""); })(); }

WebTrends.prototype.dcsCreateImage = function (dcsSrc) {       ⟵ 1318
    if (document.images) { this.images[this.index] = new Image();
    this.images[this.index].src = dcsSrc; this.index++; }            ⟵ 1316
    else { document.write('<img alt="" border="0" name="DCSIMG" width="1"
height="1" src="' + dcsSrc + '">'); }
}

WebTrends.prototype.dcsTag = function () {
    if (document.cookie.indexOf("WTLOPTOUT=") != -1) { return; }
    var WT = this.WT; var DCS = this.DCS; var DCSext = this.DCSext; var i18n =
this.i18n; var P = "http" + (window.location.protocol.indexOf('https:') == 0 ?
's' : '') + "://" + this.domain + (this.dcsid == "" ? '' : '/' + this.dcsid) +
"/dcs.gif?"; if (i18n) { WT.dep = ""; }
    for (var N in DCS) { if (DCS[N] && (typeof DCS[N] != "function")) { P +=
this.dcsA(N, DCS[N]); } }                                         ⟵ 1312
    for (N in WT) { if (WT[N] && (typeof WT[N] != "function")) { P +=
this.dcsA("WT." + N, WT[N]); } }
    for (N in DCSext) {
        if (DCSext[N] && (typeof DCSext[N] != "function")) {
            if (i18n) { WT.dep = (WT.dep.length == 0) ? N : (WT.dep + ";" +
N); }
```

FIG. 13A

```
          P += this.dcsA(N, DCSext[N]);
      }
   }
   if (i18n && (WT.dep.length > 0)) { P += this.dcsA("WT.dep", WT.dep); }
   if (P.length > 2048 && navigator.userAgent.indexOf('MSIE') >= 0) { P =
P.substring(0, 2040) + "&WT.tu=1"; }
      this.dcsCreateImage(P); this.WT.ad = "";            1314
   }
WebTrends.prototype.dcsCollect = function () {
   if (this.enabled) {
      this.dcsVar(); this.dcsMeta(); this.dcsAdv(); if (typeof
(this.dcsCustom) == "function") { this.dcsCustom(); }
      this.dcsTag();        1310
   }
}

<script type="text/javascript">     var _tag = new WebTrends();
_tag.dcsGetId();</script>
   <script type="text/
javascript">_tag.trackAllEvents=true;_tag.dcsCollect();</script>
```

FIG. 13B

METHOD AND SYSTEM THAT STREAMS REAL-TIME, PROCESSED DATA FROM REMOTE PROCESSOR-CONTROLLED APPLIANCES

CROSS-REFERENCE TO RELATED APPLICATION

This application claims the benefit of Provisional Application No. 61/640,653, filed Apr. 30, 2012.

TECHNICAL FIELD

The current document is directed to automated information acquisition from remote entities and, in particular, to a method and system for real-time, streaming of processed data obtained from remote, processor-controlled appliances to data-consuming applications and systems.

BACKGROUND

The bandwidths, complexities, and capacities of modern distributed computer systems have increased enormously during the past several decades. Millions of personal computers, mobile devices, and other processor-controlled user appliances are currently interconnected with one another by the Internet, on a global scale, and interconnected with thousands of distributed-computing systems that provide entertainment content, information, services, retailer transactions, and other services to users of processor-controlled user appliances. Electronic commerce and electronic marketplaces have grown from relatively small and crude initial retailing websites, that first appeared in the 1990's, to handling a significant percentage of retail and commercial transactions.

The rise and rapid evolution of distributed-computing-implemented services and retailing has generated many additional types of electronic services and service-provision systems. As one example, electronic retailers routinely employ third-party web-analytics services in order to collect data with regard to user interaction with web sites and to analyze the data in order to improve the retailing efficiency of websites. In certain cases, the third-party web-analytics services instrument the HTML files, script files, and other types of encodings of web pages and then receive and process data forwarded by the instrumentation, executed within user browsers on remote user appliances, to web-analytics-service-provider data centers. The web-analytics service providers also generally provide clients with the ability to design and run various types of experiments within the context of which the instrumentation-produced data is collected and subsequently used to design, refine, and deploy various types of effective and efficient web sites. E-commerce retailers and electronic service providers continue to seek new types of data-collection and data-analysis methods and systems to further their goals in electronic commerce and other types of electronic services.

SUMMARY

The current document is directed to systems and methods that stream real-time, processed data from remote processor-controlled user appliances, including personal computers, tablets, mobile phones, and laptops, to application programs for display, analysis, and other purposes and to other data-consuming devices and systems. In one implementation, a real-time processed-data streaming system includes instrumentation within remote, processor-controlled user devices, data collection at geographically distributed data-collection centers, consolidation of event messages generated by the geographically distributed data-collection centers within consolidation systems, processing of the consolidated event messages within one or more processing centers, and streaming of processed data, in the form of various types of processed-data-containing messages, to consumers of the data, including application programs that render the data for display on electronic display devices. The processing of consolidated event messages includes query processing to filter data streams directed to application-program data consumers and event-message enrichment, and may additionally include aggregation of event messages into sessions, visitor profiles, and other types of higher-level data generated from multiple events.

BRIEF DESCRIPTION OF THE DRAWINGS

FIGS. 8A-E illustrate the various types of data messages that are transmitted between computers in the example system shown in FIG. 5.

FIGS. 10A-B illustrate query-based filtering of the data stream by the processing center prior to directing the data stream to a client application.

FIGS. 13A-B provide an example of the instrumentation inserted within a web page that carries out data collection.

DETAILED DESCRIPTION

Figure 1:
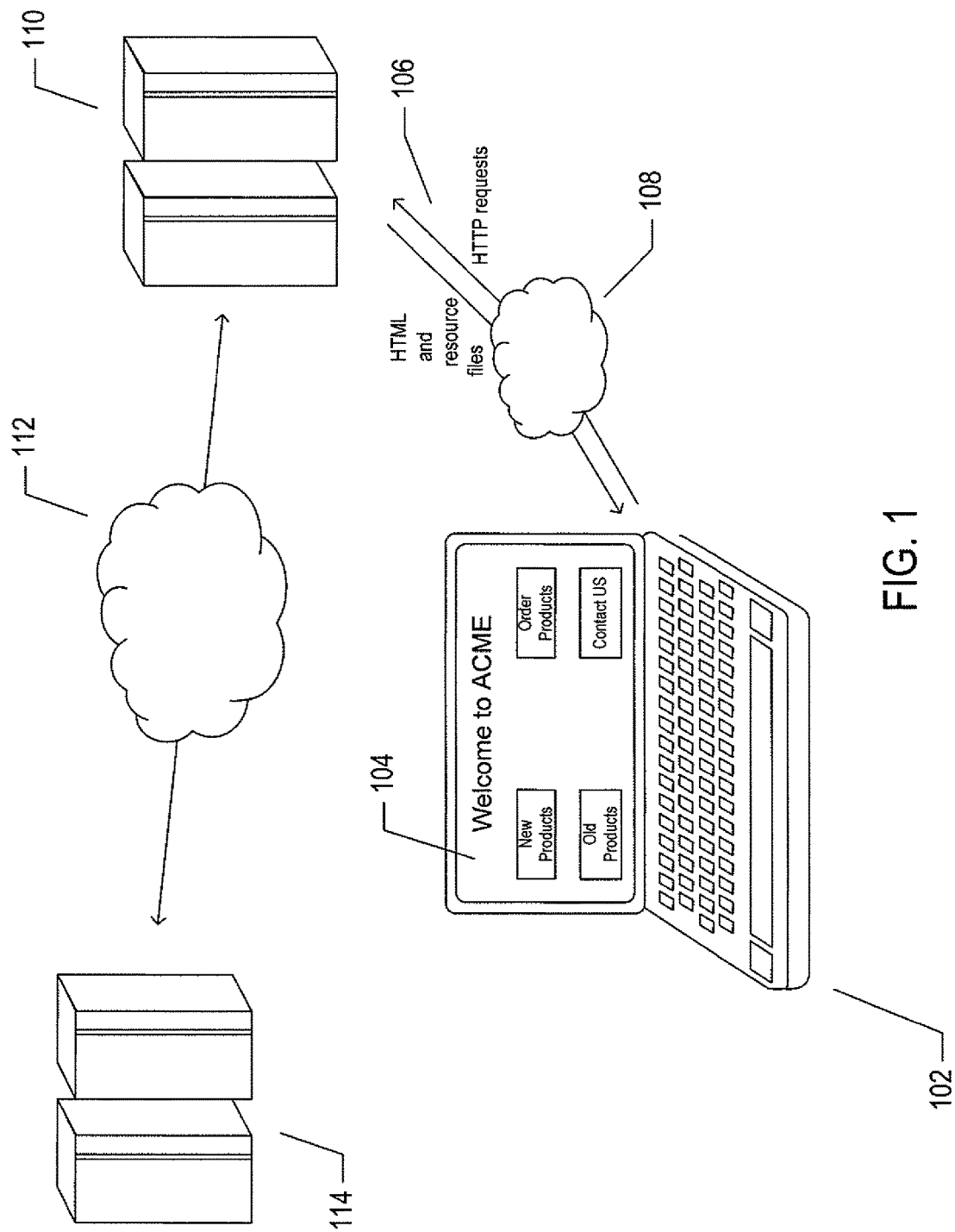
FIG. 1 illustrates an electronic-commerce environment in which methods and systems to which the current document is directed may be employed.

As discussed above, web-analytics service providers and various types of web-analysis tools, which are currently used by e-commerce retailers and other electronic-service providers to analyze the performance of web sites and the characteristics of user interaction with web sites in order to design better web sites and refine existing web sites to achieve particular goals, provide one example of data-consuming systems. As one example, analysis of user interaction with electronic-retailing web sites may allow electronic retailers to design web sites that result in a higher percentage of users accessing the web site purchasing products and/or services. Currently, data produced by instrumentation within web-site encodings, such as HTML files and JavaScript routines, is collected by data-collection systems, electronically stored, and then processed offline by a variety of different analytical tools and applications to produce reports and analyses. These reports and analyses have provided enormously valuable feedback to electronic retailers and other electronic-service providers. However, because the reports and analyses are produced and distributed offline, current web analysis services and tools are limited and constrained with respect to the types of information that they provide to e-commerce clients and other electronic-services providers. Furthermore, while electronic commerce and electronic services are quite dynamic, the significant lag times associated with producing reports and analyses currently prohibit the provision of real-time, dynamic feedback based on collected data.

The current document is directed to streaming real-time data from remote processor-controlled appliances, including from web browsers executing in remote user-processor control devices, to data consumers, including application programs that process and render the data for real-time display to web-site owners, electronic-commerce organizations, to other electronic-services providers, and other types of clients. The methods and systems to which the current document is directed enable a large variety of different types of real-time consoles and monitors that display, to clients, visual representations of the highly dynamic and highly geographically dispersed operation of web sites used for electronic commerce and other electronic-services provision. These methods and systems close the latency gap inherent in current off-line analytics processing, allowing for various types of real-time analysis of web-site operation. There are, in addition, many other types of consumers of real-time, processed data, including automated systems that monitor usage of websites, modify and tailor the web site for individual users and groups of users, and provide modified and tailored web pages and other types of information in real time. Additional data consumers include automated decision systems that may initiate many different types of automated processes in response to real-time decisions made from real-time, streaming data. The methods and systems to which the current document is directed not only acquire data through instrumentation, but may also acquire data from many other types of sources, including data rendered by web browsers and data accessed through on-line information services.

By "real-time," the current document refers to a data-collection, data-processing, and processed-data-streaming system that collects data on hundreds, thousands, millions, or more remote, geographically disperse processor-controlled user appliance and that streams processed-data that includes the collected data to a data-consuming application, system, or device within an average time interval of two seconds. In certain implementations, the average interval from data collection on the remote processor-controlled user appliances to reception of a processed-data message containing the data by a real-time, data-stream consumer is one and a half seconds or less. In certain implementations, the average interval from data collection on the remote processor-controlled user appliances to reception of a processed-data message containing the data by a real-time, data-stream consumer is one second or less. The data-collection, data-processing, and processed-data-streaming system may concurrently direct one or more data streams of one or more types to tens, hundreds, thousands, or more data consumers.

FIG. 1 illustrates an electronic-commerce environment in which methods and systems to which the current document is directed may be employed. In FIG. 1, a web browser executing within a processor-controlled user appliance, in this case a laptop computer 102, processes hypertext markup language ("HTML") files and other resource files to display a web page 104 on a display device of the processor-controlled user appliance. The HTML and other resource files are requested by the browser, via hypertext-transfer-protocol ("HTTP") requests 106 transmitted from the processor-controlled user appliance 102 via the Internet 108 to a web-server system 110. The web-server system 110 returns the requested HTML files and other resource files to the browser executing within the processor-controlled user appliance, which executes and processes the HTML files and other resource files to produce the displayed web page 104. The web-server system 110 may additionally acquire information, via the Internet 112, from one or more remote computer systems 114 for forwarding to the web browser. In order to render a particular web page, a web browser may direct HTTP requests to multiple web-server systems. In electronic commerce, a displayed web page or web pages that together comprise a web site may allow the user to view photographs and descriptions of products, carry out text-based searching for products and services, and to purchase products and services through secure e-commerce transactions, among other activities. Web sites may also allow for exchange of information between users and a web site and may serve as a portal, or jumping point, through which users navigate to other web sites.

FIG. 1 is one example of many types of many different types of processor-controlled user appliances from which the currently described system can acquire data. These include systems that execute applications that render HTML-encoded information for display to a user, other than web browsers, and many other types of information-rendering systems, the control subsystems for which include processor-executed instructions into which data-collection instrumentation is introduced. Instrumentation can be introduced into instructions produced from compilation or interpretation of any of a large number of different types of programming, scripting, and other types of languages. The processor-controlled appliances may include desktop computers, mobile computers, such as laptops and tablets, mobile phones, processor controlled consumer appliances and vehicles, system components, and many other types of devices. In general, the processor-controlled appliance needs to be communicatively interconnected with a data-collection system. Frequently, the interconnection is a communications system that connects the processor-controlled appliance to the Internet.

Figure 2:
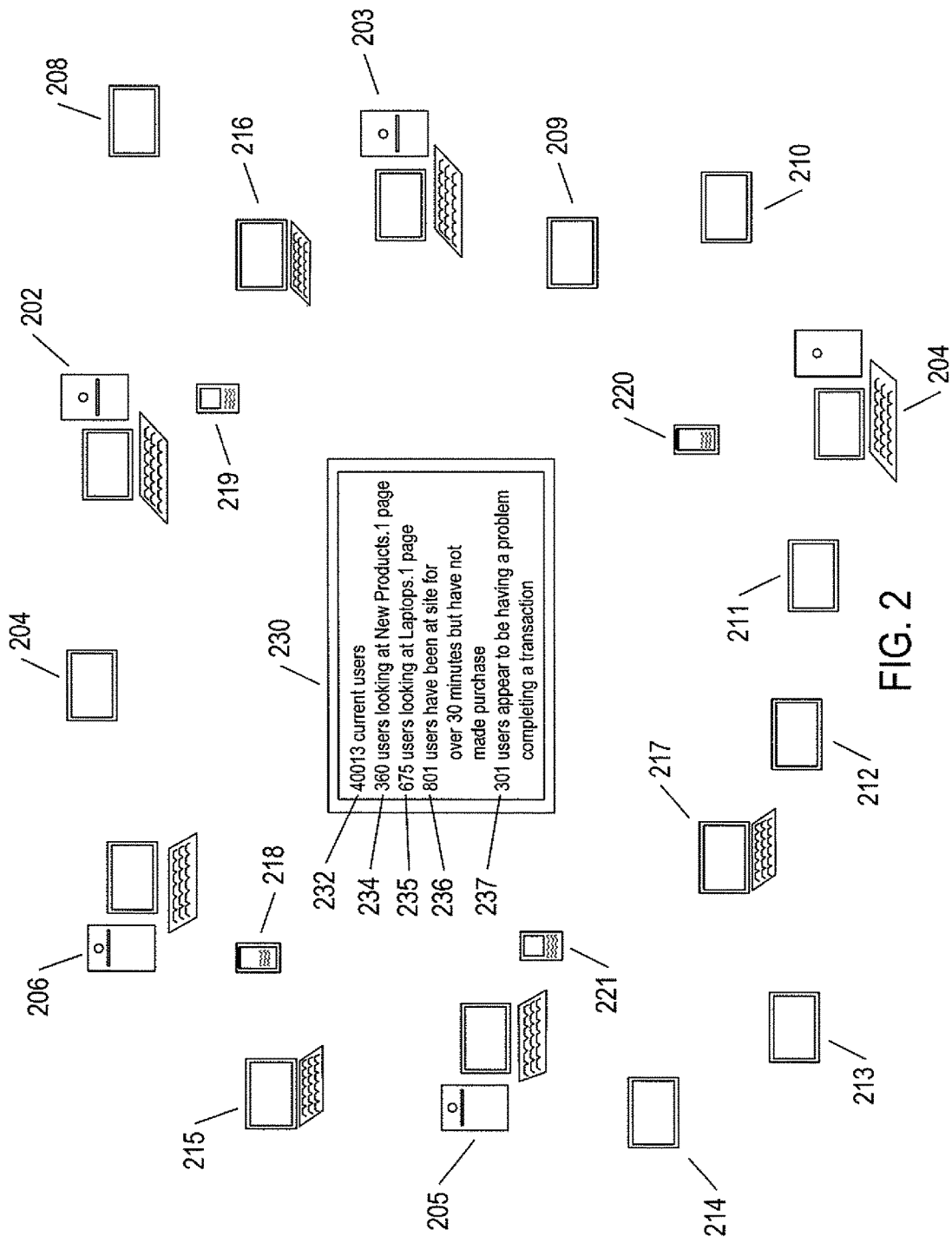
FIG. 2 illustrates an example of the type of application programs made possible by methods and systems to which the current document is directed.

The methods and systems to which the current document is directed provide real-time, streaming, processed data from remote processor-controlled user appliances accessing the web pages of a web site to one or more application programs. FIG. 2 illustrates an example of the type of application programs made possible by methods and systems to which the current document is directed. In FIG. 2, a web site is currently being accessed by a large number of different, geographically disperse users interacting with processor-controlled user appliances, including personal computers 202-206, electronic tablets 207-214, laptop computers 215-217, and mobile phones 218-221. The processor-controlled user appliances shown in FIG. 2 are a tiny subset of the potentially thousands or more processor-controlled user appliances through which users may be currently accessing the web site from all over the world. Data collected in real time from instrumentation within the HTML files and other resource files executed and rendered by browsers within the user appliances is processed and streamed to an application program running within a computer system that produces a console-or-monitor-like display 230. The application program renders the streaming data to produce a dynamic, constantly changing console or monitor 230 that indicates, in the example shown in FIG. 2, the number of current users accessing the website 232, the number of users looking at a particular web page within the web site 234-235, and the number of users in each of various different classes of users 236-237. The console-or-monitor-like display 230 provided by an application program receiving real-time, processed, streaming data allows a client to view characteristics of the world-wide operation of a web site in real time. This is an extraordinarily dynamic and powerful tool for understanding the function and operation of a web site at any particular instant in time. These types of application-program-implemented consoles and monitors may allow a web-site owner, developer, administrator, or other client to track the activities of individual web-site users at any location in the world, as one example. This provides the ability for real-time adaptation of a web site in order to address needs of individual users in real time.

Figure 3:
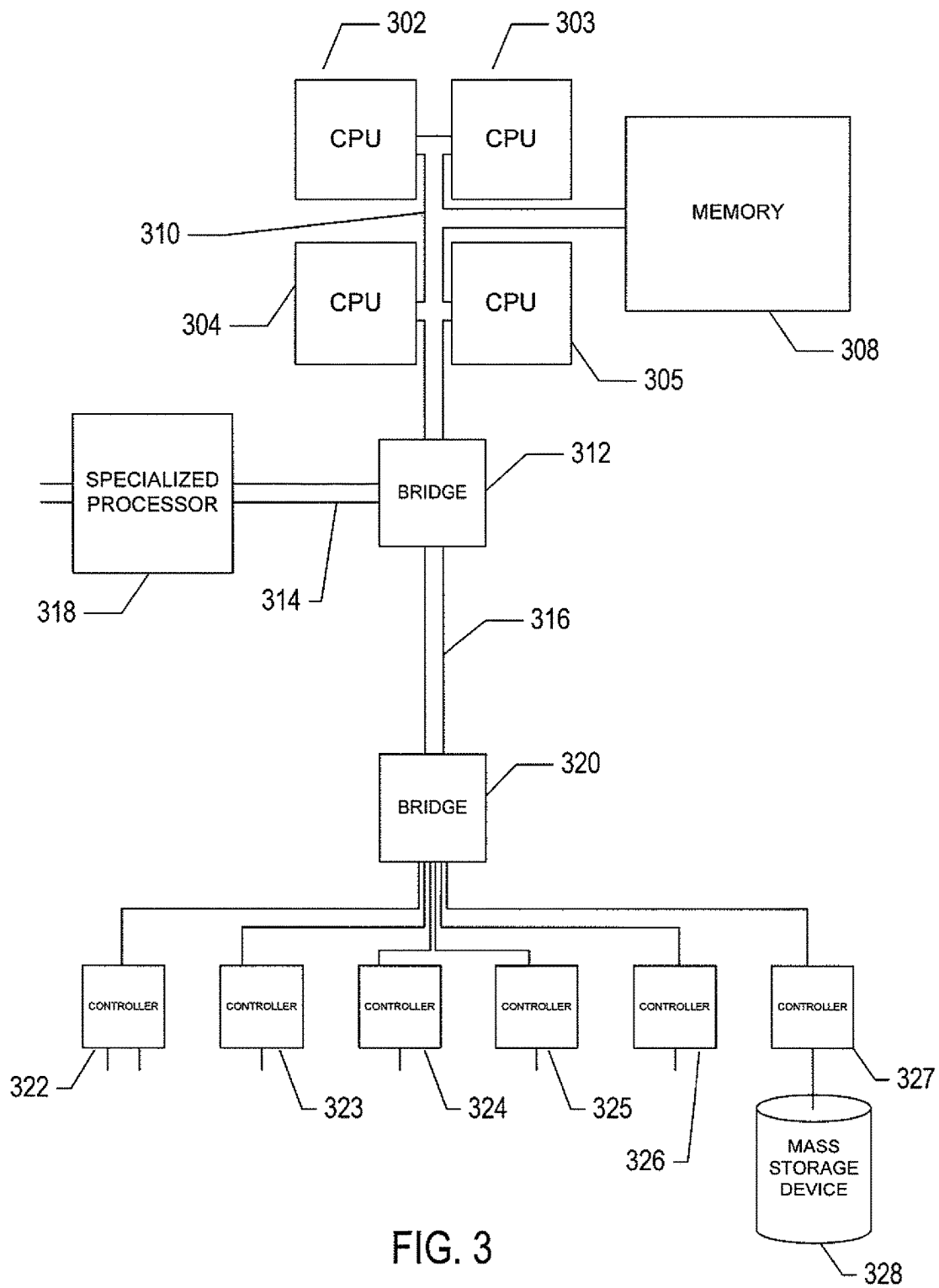
FIG. 3 provides a high-level architectural diagram of a typical computer system, such as a processor-controller user appliance or a server within a data-processing center.

FIG. 3 provides a high-level architectural diagram of a typical computer system, such as a processor-controller user appliance or a server within a data-processing center. The computer system contains one or multiple central processing units ("CPUs") 302-305, one or more electronic memories 308 interconnected with the CPUs by a CPU/memory-subsystem bus 310 or multiple busses, a first bridge 312 that interconnects the CPU/memory-subsystem bus 310 with additional busses 314 and 316, or other types of high-speed interconnection media, including multiple, high-speed serial interconnects. These busses or serial interconnections, in turn, connect the CPUs and memory with specialized processors, such as a graphics processor 318, and with one or more additional bridges 320, which are interconnected with high-speed serial links or with multiple controllers 322-327, such as controller 327, that provide access to various different types of mass-storage devices 328, electronic displays, input devices, and other such components, subcomponents, and computational resources.

It should be noted, at the onset, that the current document is directed to tangible, physical systems and methods carried out by tangible, physical systems rather than to some type of abstract concept. The physical systems and methods to which the current document is directed include user computers, web browsers executing within user computers that comprise computer instructions stored in physical memories and/or mass-storage devices, communications systems that implement Internet communications, data-collection systems, consolidation computer systems, data-processing centers, and, ultimately, client computers that execute application programs which receive streaming data and render the streaming data for display on electronic display devices to clients. As those familiar with science and technology well understand, these complex systems are not abstract, and the activities carried out by these complex systems could not possibly be carried out manually by human beings. While portions of these complex systems are implemented by stored computer instructions, these systems cannot be characterized as software or abstractions. It should also be noted that, as well understood by those familiar with science and technology, computer instructions cannot be stored in electromagnetic radiation, such as communications signals. Computer instructions and digitally encoded data can only be stored in physical data-storage devices, such as electromagnetic disks, optical disks, electronic memories, and other such physical data-storage devices. Electronic signals and electromagnetic radiation are instead used to transmit computer instructions from one computer to another.

Figure 4A:
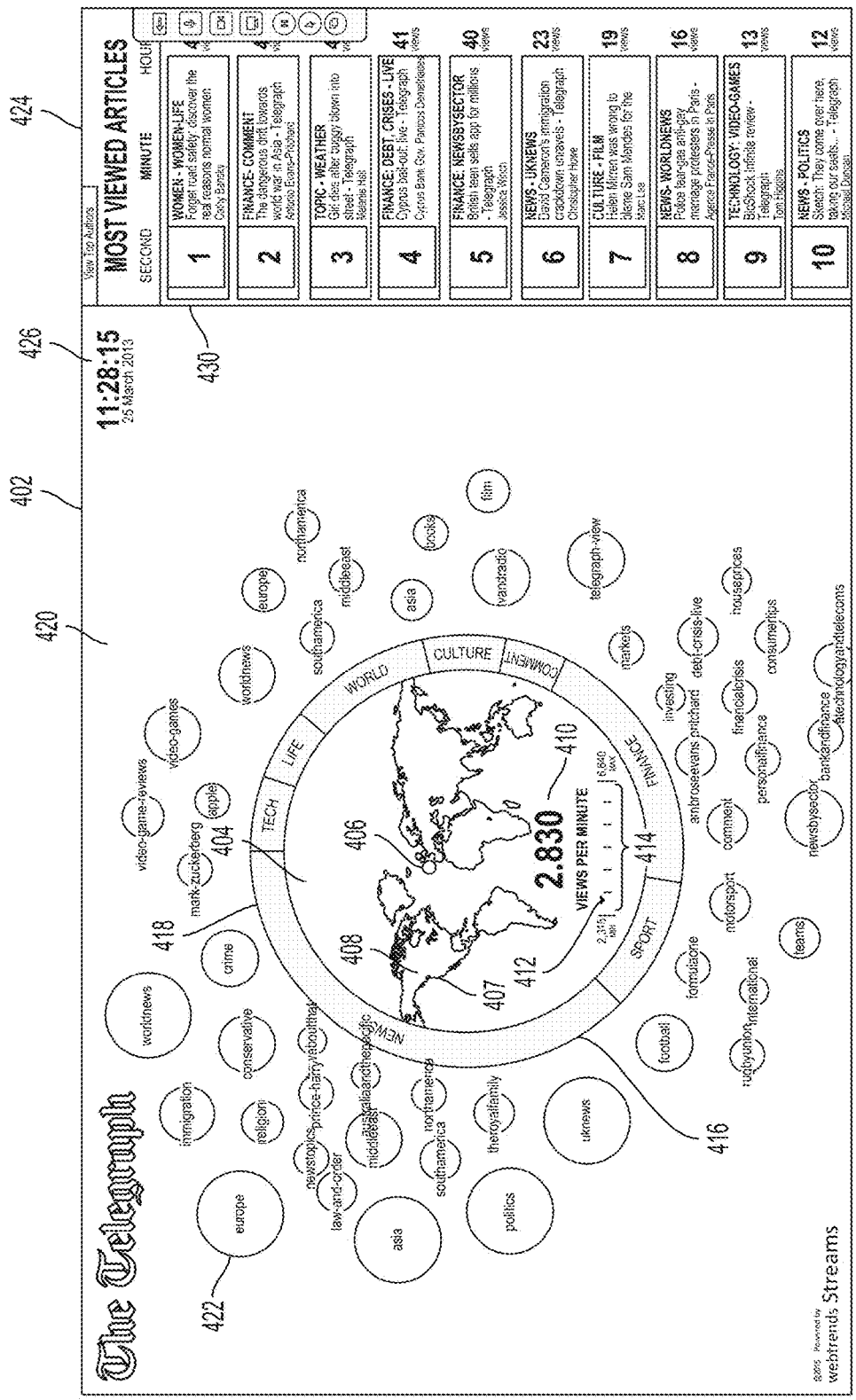
FIGS. 4A-D illustrate an actual console-or-monitor-type application that receives and renders real-time, processed, streaming data provided by the systems and methods to which the current document is directed.

FIGS. 4A-D illustrate an actual console-or-monitor-type application that receives and renders real-time, processed, streaming data provided by the systems and methods to which the current document is directed. As shown in FIG. 4A, the displayed console or monitor 402 displays real-time readership information for a news website. A central, disk-shaped section 404 of the displayed monitor shows a map of the world, with regions featuring the largest number of current viewers indicated by darkened pixels and shaded disks, such as regions 406-408. A large numeric value 410 indicates the current number of viewers per minute on the web site, also indicated by an arrow-like icon 412 within a range of views-per-minute values 414 that have been displayed during the current instantiation of the monitor.

An annular section display bar 416 indicates the portion of viewers currently viewing a page within various sections of the web site, with the number of viewers proportional to the area assigned to the section. For example, the largest number of current viewers are viewing the "news" section 418. Other sections include "tech," "life," "world," "culture," "comments," "finance," and "sport." In the main panel 420 of the monitor display, outside the annular display band 416, the number of current readers within each of various subsections of the above-discussed sections are represented by the areas of labeled disks, such as disk 422 labeled "europe." In a right-hand panel 424 of the monitor display, the top ten most currently viewed articles are shown, in descending order, in entries that include a photograph, section, title, and author, and the current number of readers. The current time and date are displayed in the upper right-hand corner of the main panel 426.

Figure 4B:
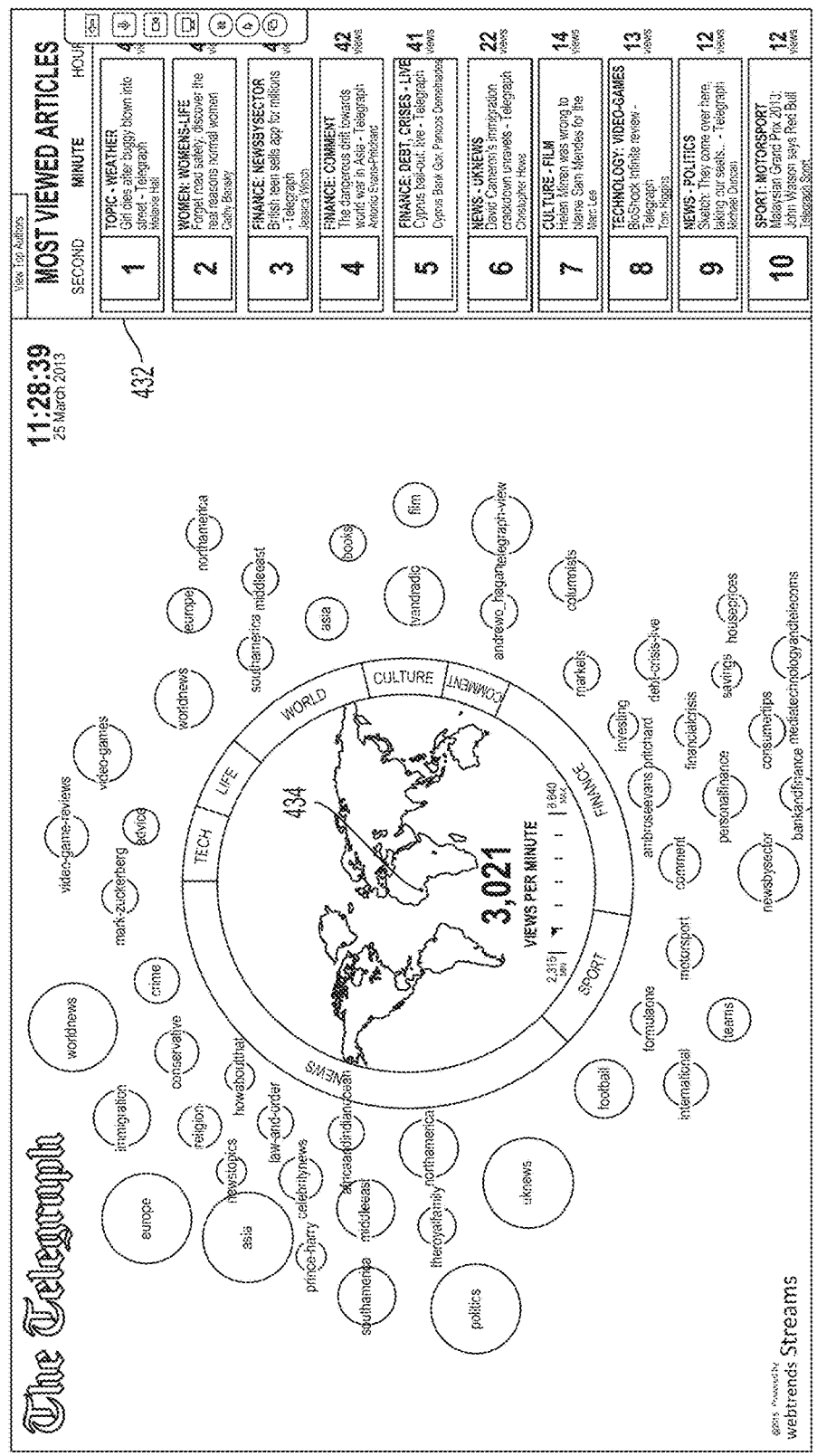
Figure 4C:
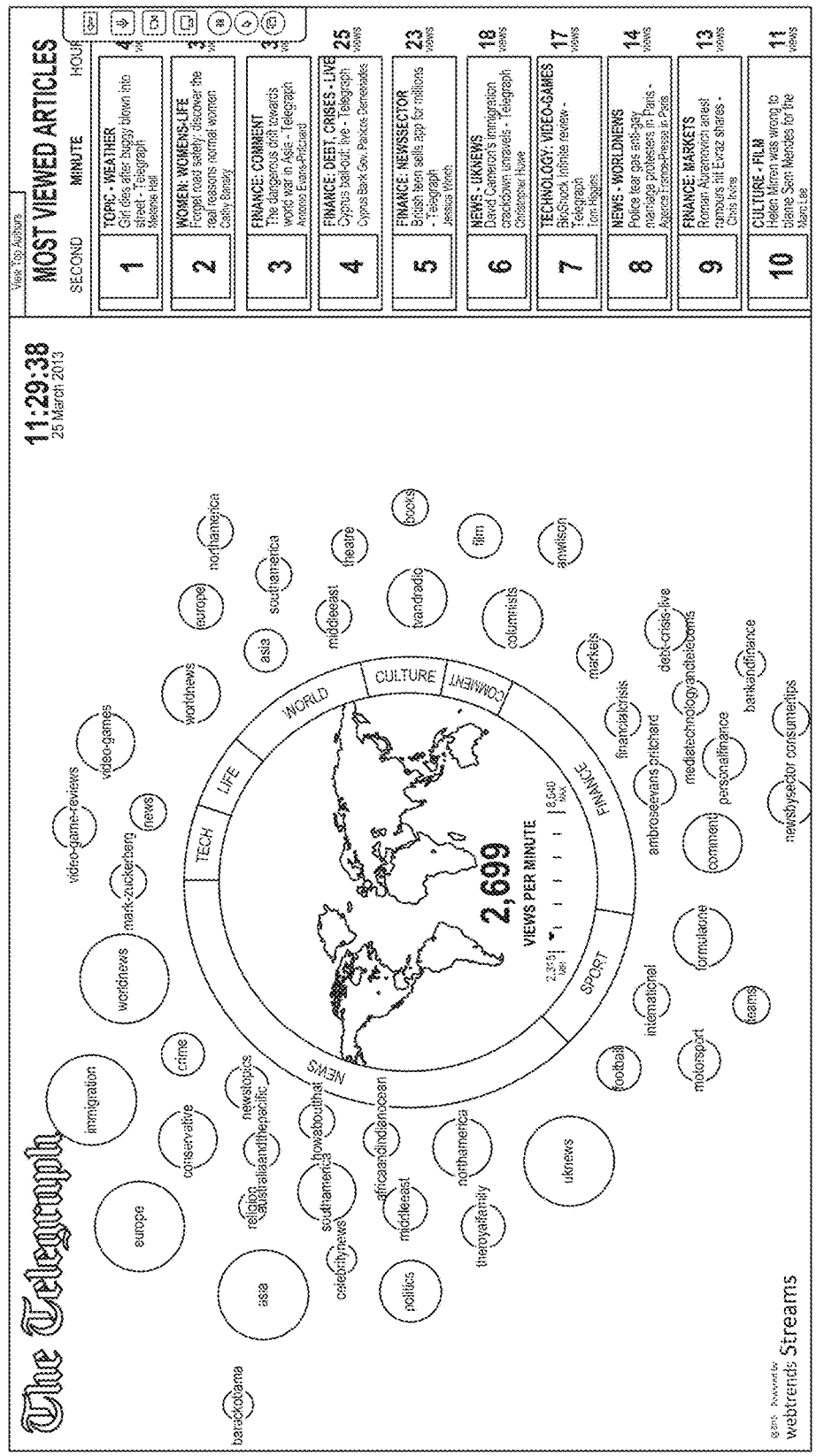
Figure 4D:
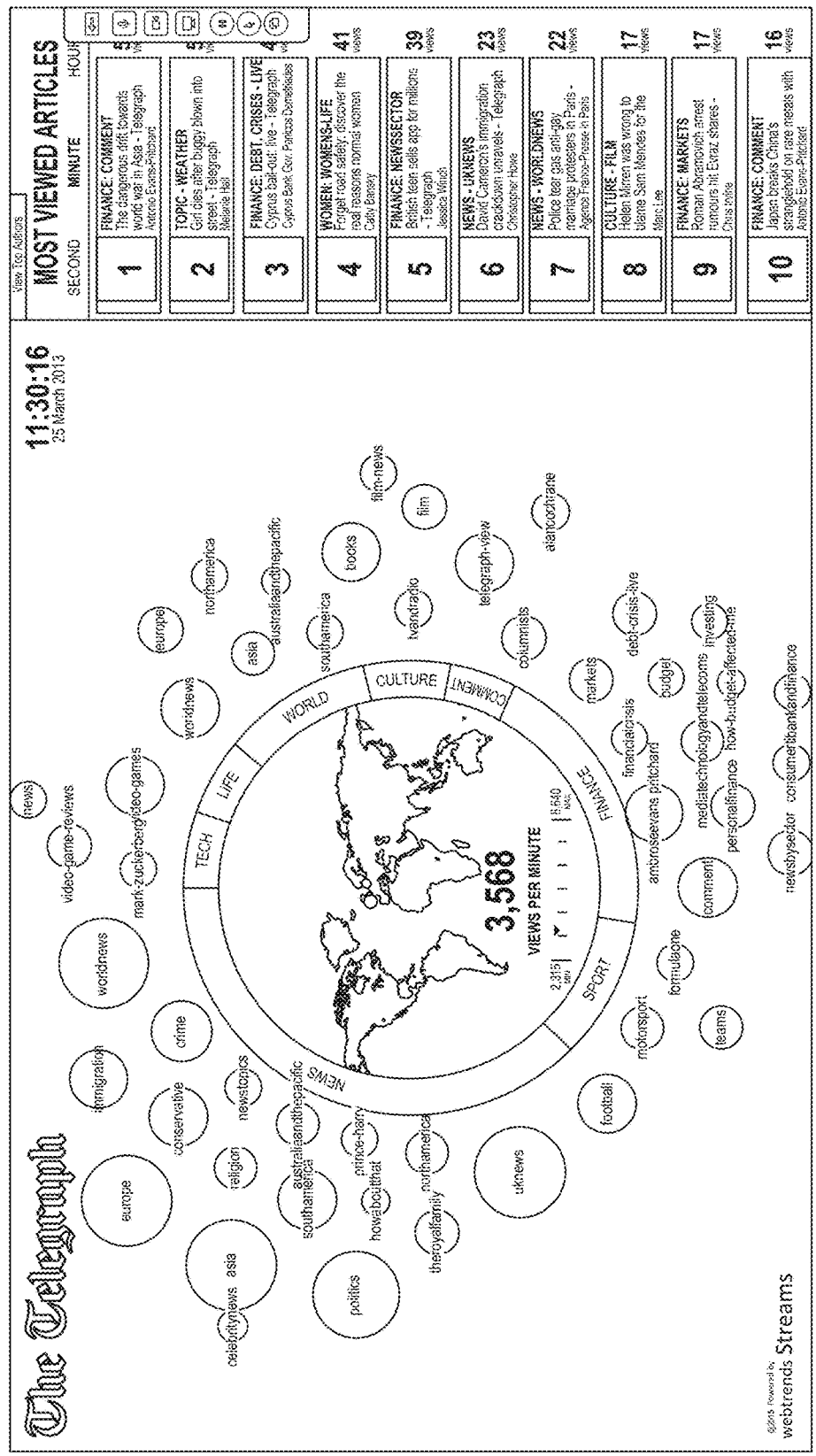

FIGS. 4B-D show screen captures of the same monitor display at various points in time following the time 11:28:15 at which the screen shot of the monitor display shown in FIG. 4A was recorded. FIGS. 4A-D illustrates the dynamic nature of the monitor display. For example, at the point in time represented by FIG. 4A, the most viewed article was a women's-section article about road safety 430. By contrast, 24 second later, as shown in FIG. 4B, the most viewed article is a weather-section article about the death of a girl during a windstorm 432. Another difference is the identification of a region in Africa 434 as one of the regions with the most current viewers while, in FIG. 4A, that region of Africa was not so identified. Many other changes can be observed in the sequence of FIGS. 4A-D.

The display monitor illustrated in FIGS. 4A-D thus provides immediate, real-time data, in a visually compelling, dynamic, easy-to-understand format, related to current viewers of the news web site all across the world. This type of information may be used for selecting articles for the web site, for targeting particular geographical areas, for targeting advertisements, and for many other such purposes.

Figure 5:
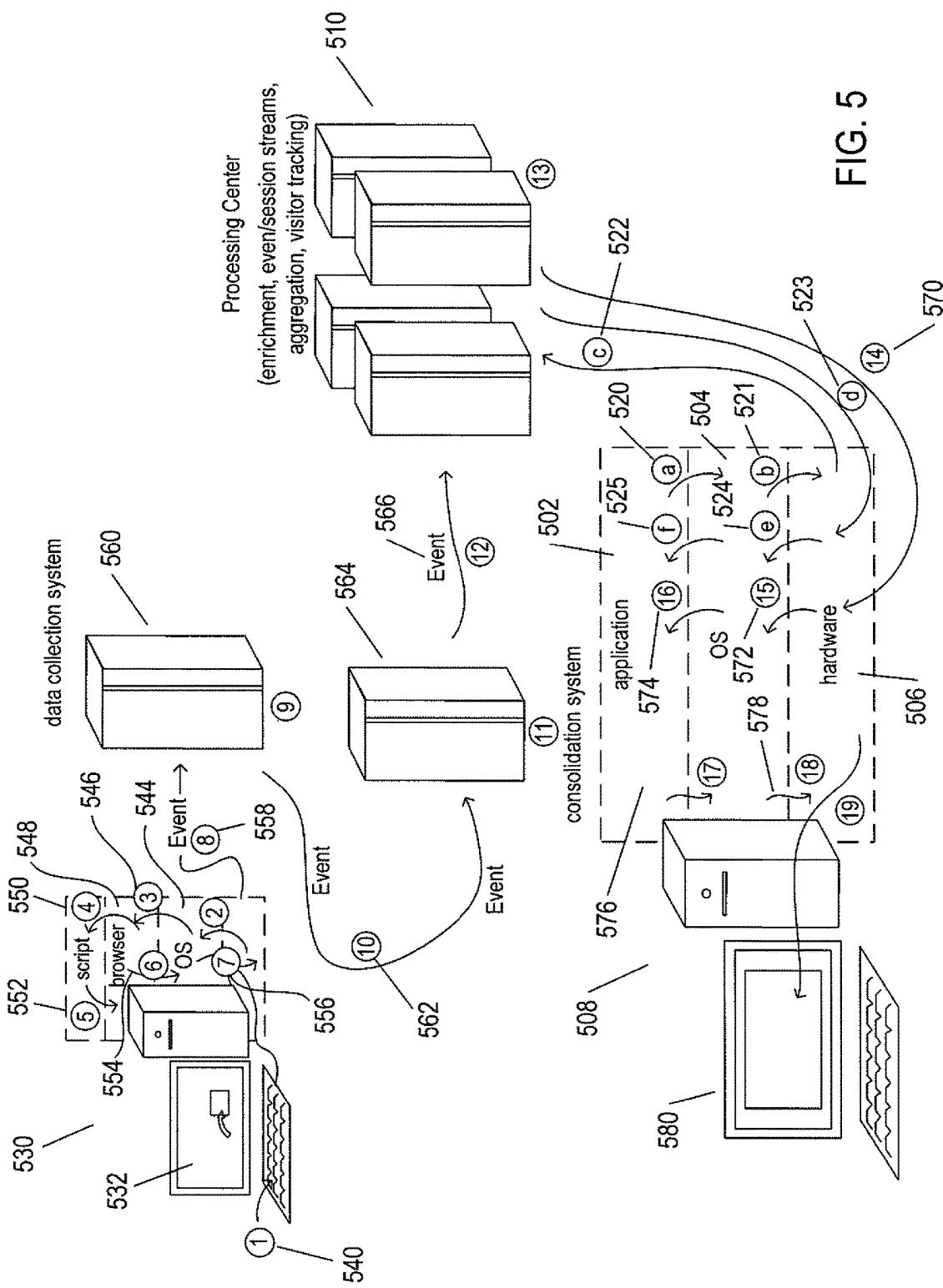
FIG. 5 illustrates the high-level components and data paths within one implementation of a system that streams real-time, processed data from web browsers executing on processor-controlled user appliances to a console-or-monitor-type application, such as that discussed above with reference to FIGS. 2 and 4A-D.

FIG. 5 illustrates the high-level components and data paths within one implementation of a system that streams real-time, processed data from web browsers executing on processor-controlled user appliances to a console-or-monitor-type application, such as that discussed above with reference to FIGS. 2 and 4A-D. Initially, when the application begins to execute, the application initializes various data structures and then opens at least one communications socket to a processing center. In FIG. 5, the console-or-monitor-like application 502 executes within an execution environment provided by an operating system 504 that executes above the hardware platform 506 within a computer system 508. The processing center 510 is generally a remote, distributed computer system that includes tens to hundreds of server computers and other types of processor-controlled devices, systems, and subsystems. In order to open a communications socket and communicate with the processing center, the following high-level steps occur: (a) the application executes an open-socket system call 520; (b) in response to the system call, the operating system creates an open-socket-request message and, via a device driver, queues the message to the input queue of a communications controller and signals the communications controller to transmit the message to the processing center 521; (c) the communications controller controls a transceiver to transmit the open-socket-request message to a listening process executing on a computer within the processing center 522; (d) the processing center returns an acknowledgement message to the transceiver 523 within computer system 508; (e) the operating system 504 within computer 508 is notified of the reception of the acknowledgement message and retrieves the acknowledgement message from a memory buffer 524; and (f) the acknowledgement message is passed to the application program to indicate successful opening of the communications socket 525. Various different types of socket requests and underlying communications protocols may be used to establish a communications link between the processing center and the application. Certain of these protocols may involve three or more different messages that implement a handshake operation. Furthermore, in most communications systems, various different types of information are exchanged between different levels of the communications stack. Errors may occur when the application program attempts to open a socket, with the type of error often indicated by return of an error message by the processing center to the application or return of an error indication by the operating system within computer system 508 to the application.

Once the socket is opened, or, in other words, a protocol-based communications link is established between the application 502 and the processing center 510, the processing center begins to send a stream of data messages to the application program through the communications socket. This stream continues until the occurrence of some type of stream-ending event, such as closing of the socket via a system call by the application program, termination of the application program, or various types of failures and computational discontinuities. The application program may choose to open two or more different sockets to the processing center in order to concurrently receive two or more different streams of data messages.

Continuing with FIG. 5, the process by which a data message is created and transmitted to the application program is next described. The system depends on instrumentation introduced into HTML files and/or other resources that are used by a web browser or other type of application program or control program. In the example shown in FIG. 5, the instrumentation is included in HTML files that are processed by a web browser 548 to render and display web pages to a remote user on a remote computer system 530. In the example, a user is viewing a currently displayed web page 532. The following events occur, in this example: (1) the user depresses a key or clicks a mouse button 540 in order to input a command, make a selection, or carry out some other such input to the web browser; (2) the user input is sensed by the hardware of the remote computer system 542, which generates an interrupt or other signal to the operating system 544 within the remote computer system; (3) the operating system receives the interrupt and notifies 546 the browser 548 within the remote computer system of the input event; (4) as a result of receiving the input, the browser executes a script routine 550 within which instrumentation has been embedded for collecting data; (5) instrumentation within the script collects data programmatically 552, encodes the data within a uniform resource locater ("URL"), and requests that the browser retrieve a remote resource specified by the URL; (6) the browser executes an HTTP request for the resource 554 that results in a system call to the operating system 544; (7) the operating system creates a request message and passes the request message to a communications-device controller 556 for transmission 558 to a data-collection system 560; (8) the data-collection system retrieves the encoded data from the URL request and packages the data in a JSON-encoded event message; (9) the event message is transmitted by the data-collection system 562 to a consolidation system 564; (10) the consolidation system consolidates event messages received from many different data-collection systems in temporary storage, with a temporary storage area allocated for the event messages corresponding to each of one or more different clients; (11) upon request from the processing center 510, the consolidation system forwards 566 a next set of events to the processing center for processing; (12) a processing center 510 processes received event messages by adding derived and calculated data to the event messages and, in certain cases, aggregating and coalescing individual event messages into higher-level messages as well as filtering the messages for output to each connection/stream; (13) those processed messages that belong to the stream requested by the application program are forwarded 570 by the processing center to the computer system 508; (14) the hardware layer of the computer system notifies the operating system and passes the received processed message or messages to the operating system 572; (15) the operating system notifies and passes the received processed messages to the application program 574; (16) the application program then uses the data to generate and update to the monitor display or console display based on the received data and passes this update 576 to the operating system; (17) the operating system controls a graphics processor and other video components of the hardware level 578 to update the monitor display or console display; and (18) update operations are transferred from the graphics subsystem to the display device 580 resulting in an update of the monitor display or console display. The consolidation systems may store collected data for a specified period of time, in certain cases, for a week or more, allowing the stored data to be subsequently streamed or re-streamed for various purposes. Data may be additionally archived for subsequent retrieval, processing, and streaming, either within consolidation systems or processing centers.

Figure 6:
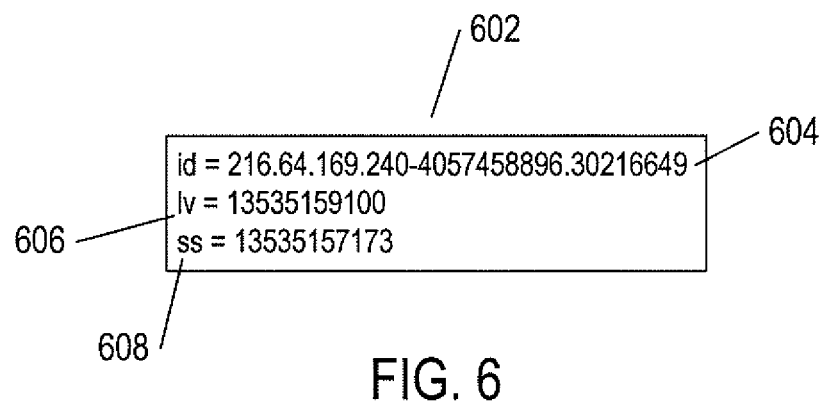
FIG. 6 shows a cookie, or small data structure, that is stored within the memory of each remote computer system that is instrumented for data collection according to the currently disclosed methods and systems.

The currently disclosed method and systems generally maintain state information within remote computer systems to facilitate data collection and processing. FIG. 6 shows a cookie, or small data structure, that is stored within the memory of each remote computer system that is instrumented for data collection according to one implementation of the currently disclosed methods and systems. The cookie 602 includes a unique identifier for the user/processor-controlled appliance 604, a system time stamp 606 that indicates the most recent event detected by the instrumentation, and a session-start time stamp 608 that indicates the time at which a session that includes the most recent event began. The identification of the user/processor-controlled appliance, id, is generally a combination of an IP address and other numbers that uniquely identify the user/processor-controlled appliance. The time stamps that indicate the last detected event, or last visit, lv, and the start of the session, ss, are generally system time values that indicate the number of seconds or fractions of seconds that have elapsed since some arbitrary point in time. The data contained in the cookie is used by the instrumentation for encoding data within a URL for transmission to a data-collection system and subsequent downstream processing of the data.

Figure 7:
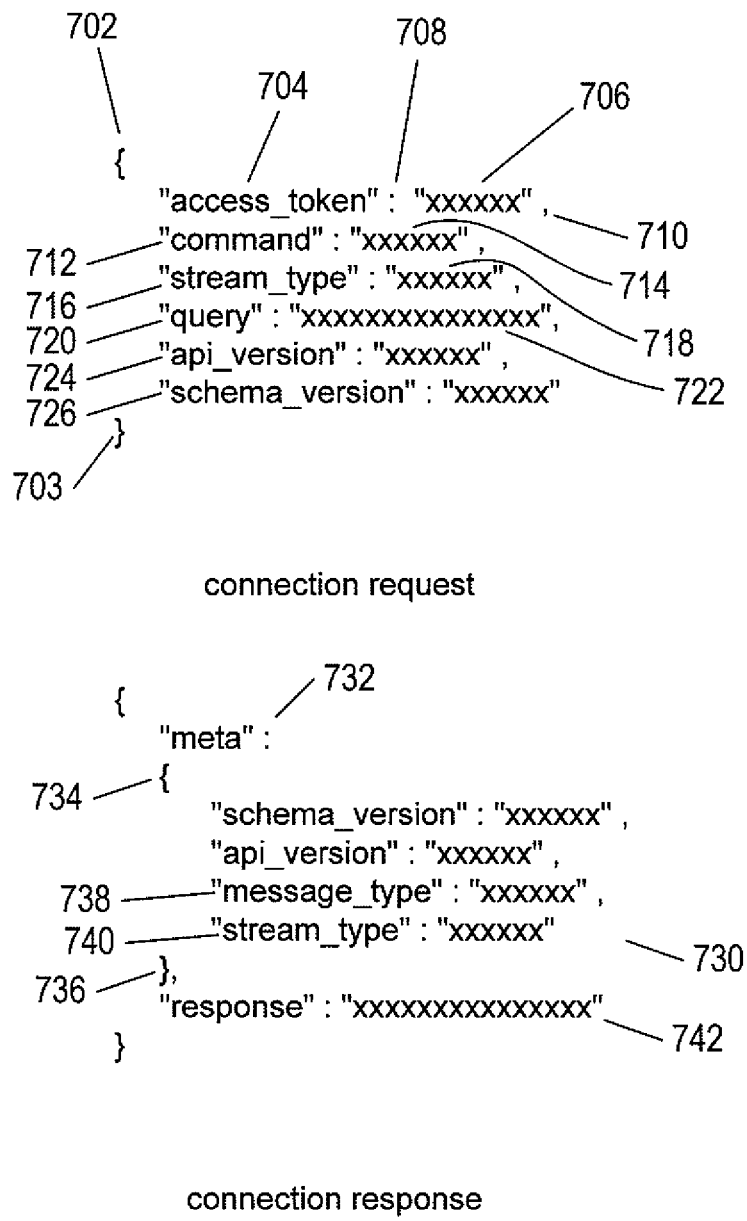
FIG. 7 illustrates JSON encodings of a connection request sent by an application to the processing center as part of the opening of a communications socket and a response message sent by the processing center back to the application program in response to a connection request.

FIG. 7 illustrates JSON encodings of a connection request sent by an application to the processing center as part of the opening of a communications socket and a response message sent by the processing center back to the application program in response to a connection request. In FIG. 7 and in subsequent figures, a pair of quotation marks enclosing a series of "x" symbols indicates where a symbol-string encoding of a data value occurs in the JSON encoding. The connection request and connection response include numerous key/value pairs. In the connection request, the outer brackets 702-703 indicate a JSON object composed of one or more key/value pairs. The first key is "access_token" 704 and a value 706 corresponding to the key occurs, within a pair of quotation marks, following a colon delimiter 708. Each key/value pair, other than the final key/value pair, is separated from subsequent key/value pairs by a comma, such as comma 710 following the first key/value pair 704, 706, and 708. The access token is a symbol string that is obtained from a data-streaming service as a credential that allows access to data streams by application programs. The key "command" 712 is associated with a symbol-string value 714, such as the symbol string "stream," that requests a particular type of action or service from the processing center. The key "stream_type" 716 is associated with a value 718 that indicates one of various types of streams that the application program wishes to receive through the communications socket. Examples include event streams and session streams. The key "query" 720 is associated with a symbol-string value 722 that specifies a structured-query-language-("SQL")-like query that is used, by the processing center, to filter data messages and the contents of data messages prior to directing a filtered stream of data messages to the application program. The "api_version" key/value pair 724 and "schema_version" key/value pair 726 specify a streams application program interface ("API") version and a query-language version to the processing center. Because the streams API and query language may be revised and updated to generate a series of versions with increasing version numbers, these key value pairs inform the processing center of the API version being used by the application program and the query language version used by the application program to create the queries included as the value of the "query" key/value pair, allowing the processing center to appropriately respond to a connection request.

The connection response message 730 has the form of a JSON-encoded data message. In all JSON-encoded data messages, in one implementation, the message object includes an initial "meta" object specified by the symbol string "meta" 732 and a number of key/value pairs within the meta object delimited by brackets 734 and 736. The meta object includes the above-discussed "api_version" key/value pair and "schema_version" key/value pair. In addition, the meta object includes a "message_type" key/value pair 738, example values of which include "success" and "error," and a "stream_type" key/value pair 740, the value of which specifies the type of data stream that has been opened, examples including "event" and "session." Following the meta object, the connection response includes a response key/value pair 742 with values indicating either success or providing an explanation of an error that has occurred. A JSON-encoded connection request is transmitted to the processing center as part of the open-socket request and a JSON-encoded connection response message is returned by the processing center in response to the open-socket request.

Figures 8A, 8B:
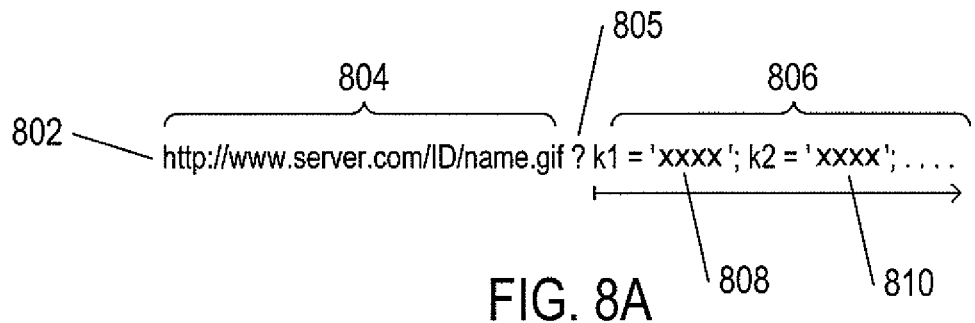
Figure 8E:
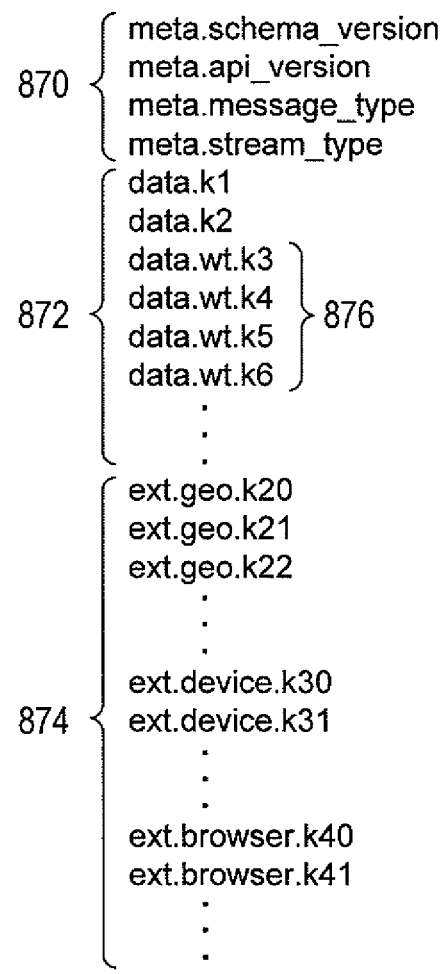

FIGS. 8A-E illustrate the various types of data messages that are transmitted between computers in the example system shown in FIG. 5. As discussed above, the data initially collected by instrumentation within the web browser is encoded as a series of key/value pairs within a URL. FIG. 8A illustrates the encoding of key/value pairs generated by instrumentation within a URL. The URL 802 includes a path name to a resource stored on a data-collection server 804 followed by a question mark 805 and then a series of semi-colon-delimited key/value pairs 806. In FIG. 8A, and in subsequent figures, the symbol strings "k1," "k2," . . . are used to indicate different keys and the corresponding values are generally indicated by a series of "x" symbols between pairs of single quotes or double quotes, such as "x" symbol strings 808 and 810 in FIG. 8A indicating the values corresponding to keys "k1" and "k2." The values may be any alphanumeric symbol string and the key names may also be arbitrary alphanumeric symbol strings.

FIG. 8B illustrates a JSON-encoded event message that is generated by a data-collection system, transmitted to a consolidation system for storage, and pulled from storage and transmitted to the processing center. A JSON-encoded event message includes a "meta" object 812, previously discussed with reference to FIG. 7, and a "data" object introduced by the symbol string "data" 814 and including key/value pairs and objects within the bracket pair 816-817. A "data" object may include key/value pairs, such as key/value pairs 818 and 820, and objects, such as the object named "wt" 822 that includes key/value pairs within brackets 824-825. Key/value pairs may include two symbol strings separated by a colon, such as key/value pair 826 or may comprise a key followed by a colon that is in turn followed by an array of symbol strings, such as key/value pair 828. Arrays of symbol strings are delimited by square brackets, such as the pair of square brackets 830. Event messages generally include a "meta" object and a "data" object.

FIG. 8C illustrates an enriched event message that is produced within the processing center (510 in FIG. 5). An enriched event message includes a "meta" object 840, a "data" object 842, and an "ext" object 844. The "ext" object includes three lower-level objects "geo" 846, "device" 848, and "browser" 850. The geo object contains key/value pairs that describe the geographical location of a user/processor-controlled user appliance. The device object 848 includes key/value pairs that characterize the user/processor-controlled appliance. The browser object 850 includes key/value pairs that characterize the type of browser used by the user. The data values included in the "ext" object 844 are derived from the data values included in the "meta" and "data" objects as well as additional calculated values and data sources accessible to the processing center and used for event-message enrichment. Many types of enrichments are possible. For example, an enriched even message may include indications of the current weather at a user's location, the size of the town or city in which the user is located, public data related to the user, and many other types of information.

FIG. 8D illustrates a session message. A session message is a higher-order message that includes session information as well as a "session summary" object and an array of "event" objects. The "meta" object 860 is the same as the "meta" object in previously described event messages. A number of key/value pairs 862 describe session-related information. The "session summary" object describes the number of events included in the session message and other information related to the session 864. Finally, the key/array pair "events" 866 includes the traditional enriched-event data for each of a series of events.

The data within a JSON-encoded data message may alternatively be described using a hierarchical notation. The alternate hierarchical notation for the extended event message shown in FIG. 8C is provided in FIG. 8E. The keys within the "meta" object are specified by strings that begin with the substring "meta" 870. The keys contained in the data object 842 are specified with strings that begin with the substring "data" 872. The keys contained within the "ext" object 844 are specified by symbol strings that begin with the substring "ext" 874. Periods are used to delimit hierarchical levels. For example, there is only a single hierarchical level within the meta object and thus all of the keys within the meta object of FIG. 8E include a single period between the substring "meta" and the names of the keys of the key/value pairs contained in the meta object. By contrast, the keys that occur within the "wt" object that, in tarn, lies within the "data" object 842 include two periods 876 to indicate two hierarchical levels. The hierarchical key names shown in FIG. 8E can be thought of as the names of variables, and the corresponding values are the values stored in the variables.

Figure 9A:
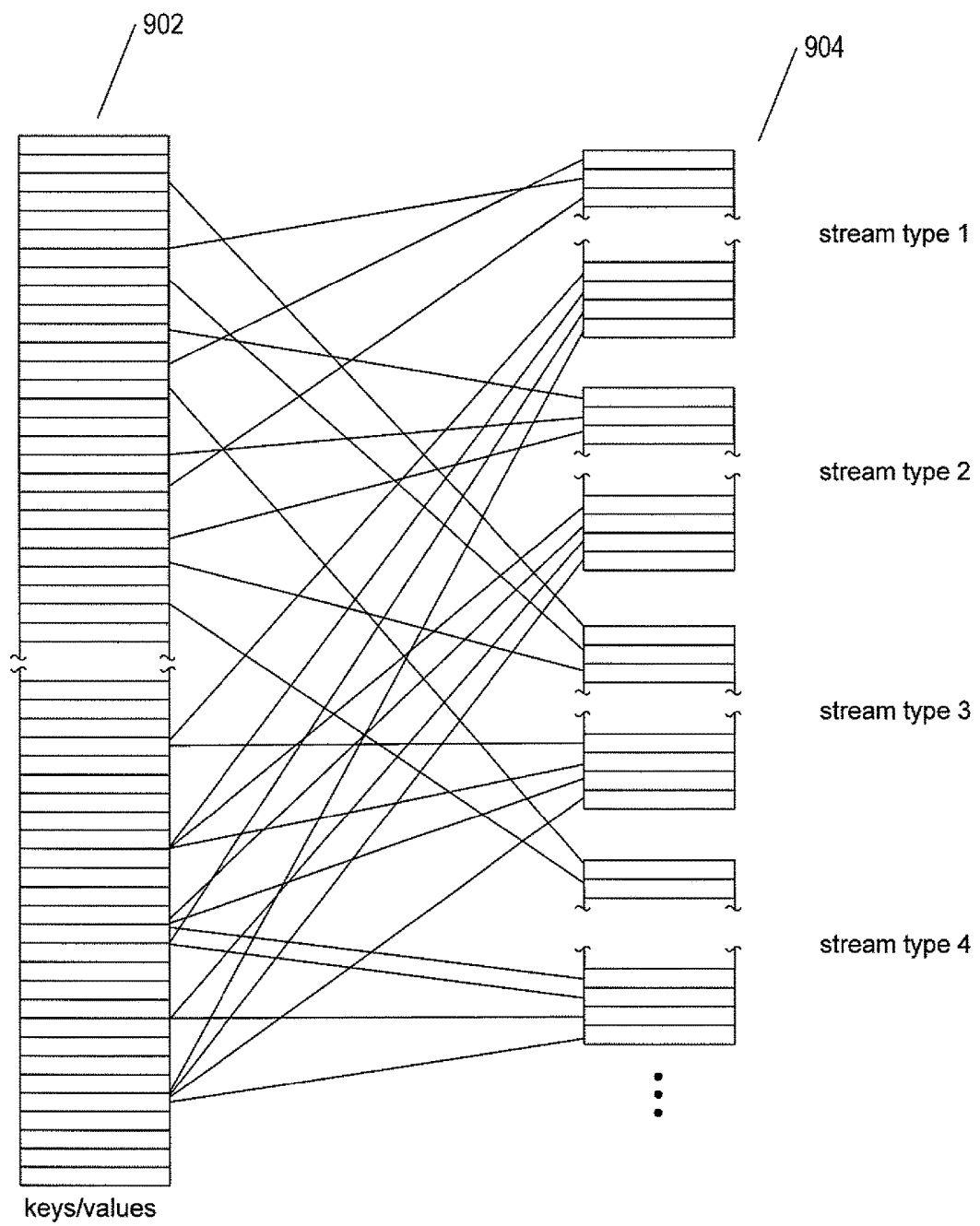
FIGS. 9A-B illustrate the data that is collected by instrumentation and eventually passed to consumers of data messages produced by the processing center.
Figure 9B:
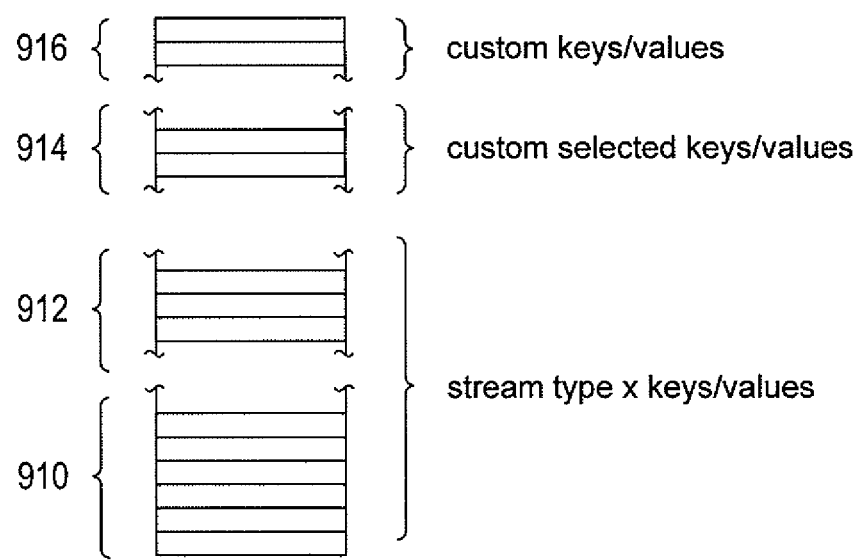

FIGS. 9A-B illustrate the data that is collected by instrumentation and eventually passed to consumers of data messages produced by the processing center. In FIG. 9, a left-hand column 902 represents a very large number of different types of data values that may be collected within a script executing within an execution environment provided by a web browser by instrumentation code. Each cell within the column represents a different data value. Almost any type of data value that can be accessed from the script or computed by the script is a candidate for data collection by instrumentation. The data values may be values produced by system calls, such as a call to a system-time routine or a call to retrieve the IP address of the computer within which the web browser is executing. Other values include data values that indicate a particular state of a displayed web page within the context of a web site, such as indications of pages, sections, and subsections currently accessed by a user, indications of various types of input events to web pages, indications of other web sites through which a user passed in navigating to the current web site, information requested by and displayed to a user, and many other types of information related to a user's interaction with the web site. The data values are named hierarchically, as discussed above with reference to FIG. 8E, or, equivalently, associated with key symbol sequences encoded within a JSON-encoded message. In either case, each data value is uniquely named and can be extracted from the parameters within a URL passed to a data-collection system by a web browser executing on a remote user computer.

As discussed above, with reference to FIG. 7, a client of the real-time, processed-data streaming system disclosed in the current document may open up a communications socket to receive a stream of processed data messages. Different types of streams may be requested. As shown in FIG. 9, each different stream type, such as stream type 1904, represents a subset of the data values that may be collected by instrumentation. Each different stream type therefore identifies a different subset of data values and therefore represents a type of data filtering that results in streaming only a desired subset of the possible data types to a particular client through a particular communications socket, rather than streaming all possible collected data and requiring the client to expend communications and processing bandwidths to receive and process a large amount of data in each data message in order to obtain a desired subset of the data values.

FIG. 9B illustrates the types of data values that may be included in a data message streamed to a client. These data values may include a set of data values common to all data messages 910, a set of data values unique to a particular stream type 912, additional, custom-selected data values selected from the set of data values represented by column 902 in FIG. 9A 914, and additional data values specified by a particular client 916. In the case of the latter data values, instrumentation is modified in order to collect the client-specified data values 916 not included in the data values that may be collected by existing instrumentation within the real-time, processed-data-streaming service, represented by column 902 in FIG. 9A.

Figure 10A:
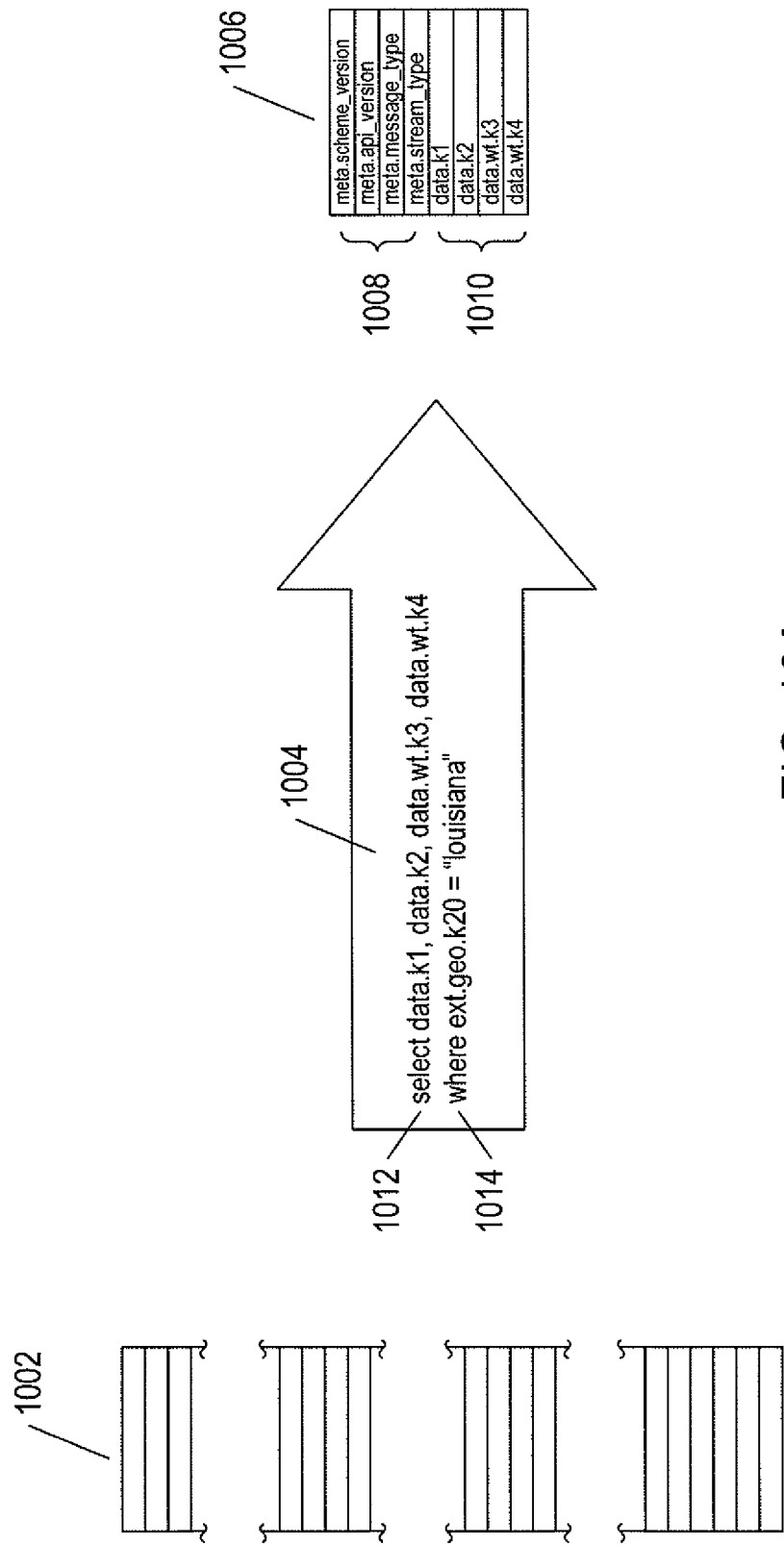

FIGS. 10A-B illustrate query-based filtering of the data stream by the processing center prior to directing the data stream to a client application. In FIG. 10A, the collection of data values that together represent those data values specified by a stream type as well as by custom selection or definition by a client are represented by column 1002, as they are represented in FIG. 9B. The processing center applies a client-specified query 1004 to each data message, prior to transmitting the data message into the stream of data messages directed to a client. The query represents a second-level filter that may filter out entire data messages or portions of data messages. In the example shown in FIG. 10A, as a result of query 1004, the final data message 1006 added to the stream directed to the client includes only the meta-object data values 1008 and four additional data values 1010 selected by the query 1004. Queries may include a "select" clause, a "where" clause, or both a "select" and a "where" clause. Query 1004 includes a "select" clause 1012 that selects four specific data values to include in data messages streamed to the client as well as a "where" clause 1014 that filters out data messages other than data messages that contain the data value "louisiana" associated with the key "ext.geo.k20."

FIG. 1013 illustrates a number of different queries. The query 1020 selects all data values included in incoming data messages of a particular stream type and selects all of the incoming data messages, since there is no "where" clause associated with the query. The "*" symbol, in a query, is a wild-card symbol and, in query 1020, stands for all possible keys. Query 1022 selects a number of specific data values to include in data messages streamed to the client who issued the query in a connection request. Query 1024 is similar, but selects, using the wild-card symbol, all of the data values in the object "data" and the object "geo" within an event message. Query 1026 selects specific session-related data values and all of the events within a session message, but only for those session messages that represent a complete session, as specified by the "where" clause "where session.closed='true.'" Query 1028 includes only a "where" clause and selects only closed session messages that represent sessions in which users did not purchase anything from a web site. The query language is SQL like, supporting a variety of Boolean connectors, parentheses, comparison operators, and other common SQL-like query language features.

Figure 11:
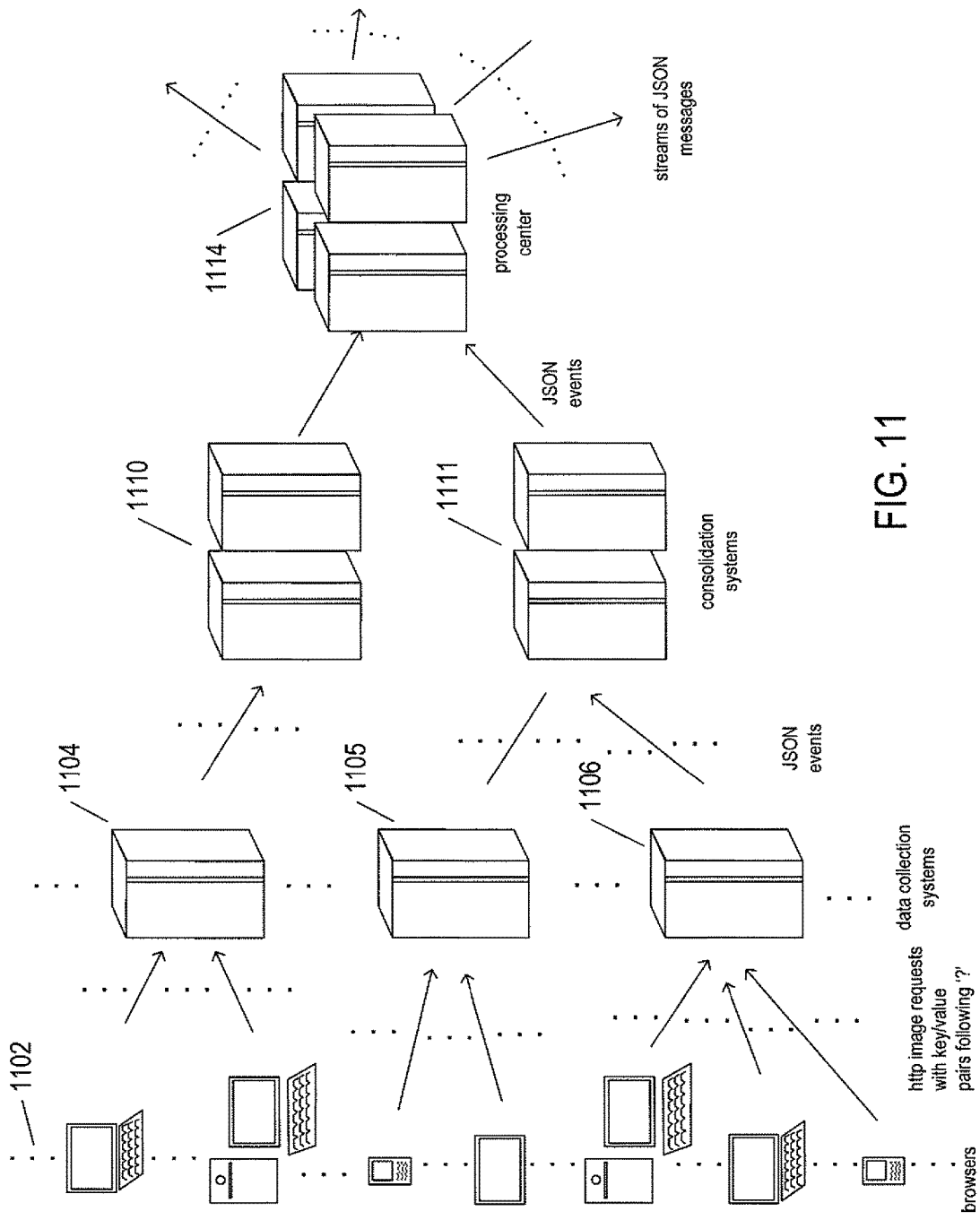
FIG. 11 illustrates, in a fashion similar to FIG. 5, an example of the real-time, processed-data streaming system and associated methods to which the current document is directed.

FIG. 11 illustrates, in a fashion similar to FIG. 5, an example of the real-time, processed-data streaming system and associated methods to which the current document is directed. As discussed previously, data collection occurs within HTML files or scripts executed by browsers running within the remote processor-controlled user appliances shown in column 1102. Web browsers make HTTP requests for resources, specified by URLs, that are directed to various different geographically dispersed data-collection systems 1104-1106. Listener processes within the data-collection systems receive the parameter string following the "?" symbol in the URL specification of a resource, generate, from the key/value pairs in the parameter string, a JSON-encoded event message, and transmit the JSON-encoded event messages to a consolidation system 1110 and 1111.

In one implementation, the consolidation systems comprise a large number of servers that execute, in a distributed fashion, the Kafka distributed messaging system. Kafka is a distributed messaging system developed for collecting and delivering high volumes of log data with low latency. Kafka processes streams of incoming messages, dividing the incoming messages into messages belonging to each of a number of categories, referred to as "topics." The currently disclosed real-time, processed-data streaming system may, for example, partition collected data into topics that each corresponds to a different client organization. Kafka further partitions topics into topic partitions, each of which comprises a set of segment files stored in memory and/or mass-storage devices. Kafka also defines brokers, which are distributed processes, each of which may process incoming messages for a particular set of topics and topic partitions. Messages are input to Kafka by producers, and thus, in the currently disclosed system, the data-collection systems represent the producers. The Kafka system aggregates the incoming messages for each topic and stores the messages in segment files for subsequent retrieval by consumers. In the currently disclosed system, the processing center or processing centers 1114 are the consumers of messages consolidated by the Kafka distributed messaging system. Incoming messages are appended to a current in-memory segment file. Once the segment file fills up, it is flushed to mass storage, at which point the messages are made available to consumers. Kafka stores messages for a defined period of time, often on the order of a week. During that time, consumers may repeatedly access messages. In general, the Kafka distributed message system acts as a kind of very large input/output queue, with the lag time between message input and message consumption on the order of seconds or fractions of seconds, when used in the currently disclosed real-time processed-data streaming system.

In one implementation, the currently disclosed real-time processed-data streaming system employs a Storm big-data processing system within the processing center. Storm is an open-source system originally developed for handling Twitter messages. Storm is fully distributed and features high performance, fault-tolerance, and guaranteed message processing. The conceptual model for Storm is a graph representing interconnections between spouts, which are data sources, and bolts, which are data-processing entities. Spouts pull data messages from the consolidation systems and pass the data messages on to one or more bolts, each of which performs processing activities, including enrichment, query filtering, and other such processing. The spouts and bolts are interconnected by communications paths, with the furthest-downstream bolts emitting processed data messages through communications sockets to client applications.

Figure 12:
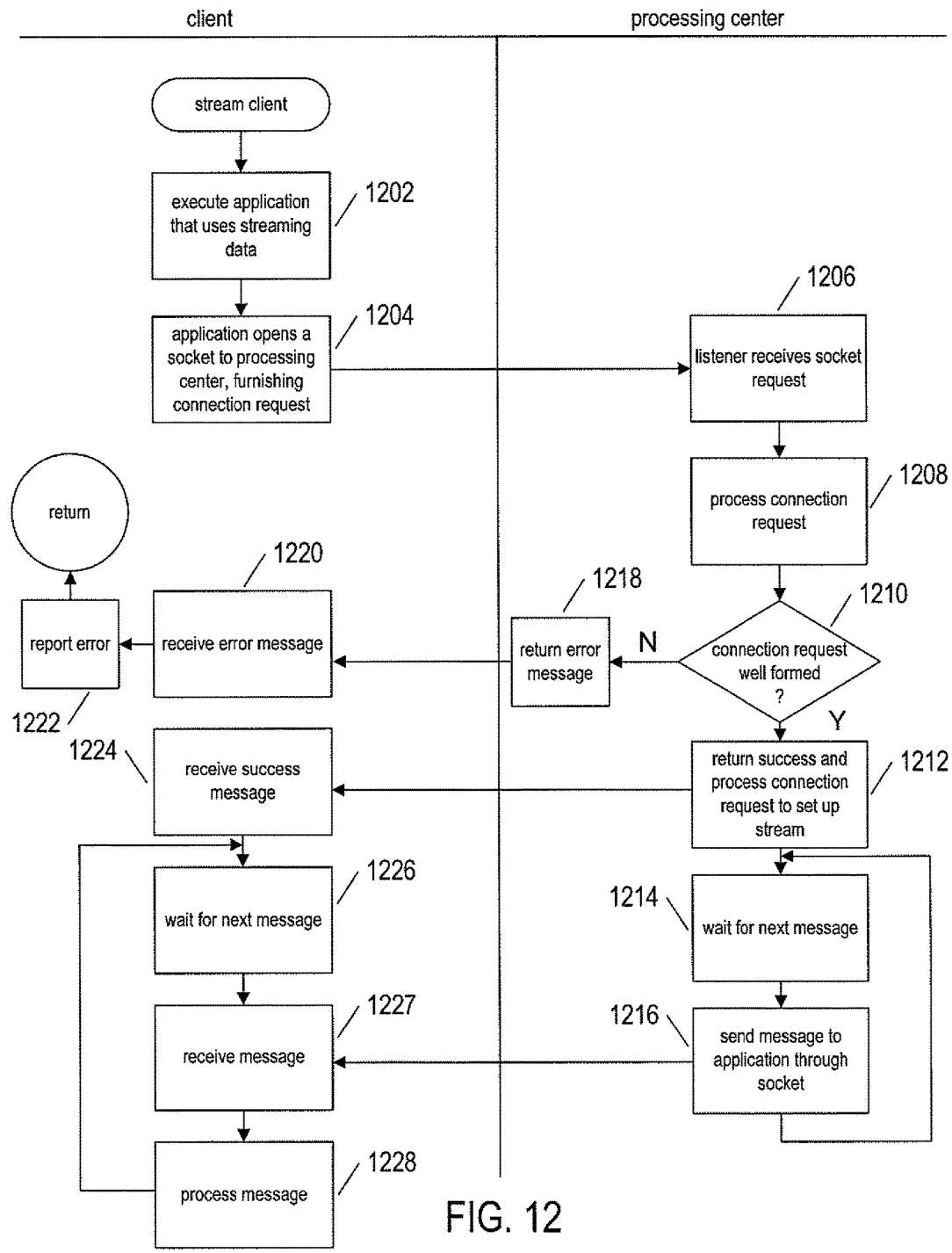
FIG. 12 illustrates the interaction between a client of the currently disclosed data-streaming system and the processing center in the implementation shown in FIGS. 5 and 11.

Next, operation of the currently disclosed real-time processed-data streaming system and the currently disclosed methods are discussed with reference to numerous control-flow diagrams. FIG. 12 illustrates the interaction between a client of the currently disclosed data-streaming system and the processing center in the implementation shown in FIGS. 5 and 11. As discussed above, the client is generally an application program that runs on a client computer system and that renders incoming, streaming processed-data messages for visual display in the context of a monitor display or console display. In FIG. 12, client activities are shown on the left-hand side of the diagram and processing-center activities are shown on the right-hand portion of the diagram. In step 1202, the client executes the application program that uses streaming data. In step 1204, the application program executes an open-socket command, furnishing to the command a JSON-encoded connection request, as discussed above with reference to FIG. 7. In step 1206, a listener process within a processing center receives the socket request and, in step 1208, processes the connection request. Processing involves authorizing the access using the access token supplied in the connection and parsing the connection request. When the connection request is well formed, as determined in step 1210, then, in step 1212, the processing center processes the connection request to set up a stream of processed-data messages for transmission to the client application through the communications socket. This may involve initializing data structures, launching one or more streaming processes, and other such initialization activities. Then, in the continuous loop of steps 1214 and 1216, the one or more streaming processes wait for a next processed-data message for transmission through the communications socket to the application program, in step 1214, and transmit the message to the application program in step 1216. Otherwise, in step 1218, when the connect request is ill-formed, the processing center returns an error message to the client. In step 1220, the client application receives the error message and, in general, reports the error to a client user or administrator, in step 1222. In certain cases, the application program may attempt to correct or change the connection request and resubmit it, automatically, in a new connection request in order to continue execution. When the processing center returns a success message, in step 1212, the client application receives the success message in step 1224 and then enters a continuous loop in which the application program waits for a next processed-data message, in step 1226, receives the message in step 1227, and processes the message in step 1228. As discussed above, processing of processed-data messages generally results in an update of the internal application state and internal data that is either immediately or subsequently reflected in changes in the control display or monitor display viewed by a client user.

Of course, in actual implementations, multiple different cooperating processes may collaborate to carry out the activities described with reference to FIG. 12. Furthermore, any of many different buffering techniques, asynchronous-event handling techniques, and other techniques may be employed to implement stream processing both in the processing center and in the client computer system.

FIGS. 13A-B provide an example of the instrumentation inserted within a web page that carries out data collection. The data collection is initiated, from a web page, by a script (1302 in FIG. 13B) embedded within an HTML file that specifies a particular web page displayed to a user. The script creates a new tag object 1304 and then calls a "dcsCollect" tag member function to collect data and transfer the data to a data-collection system 1306. The "dcsCollect" member function 1308 calls a "dcsTag" function 1310. The "dcsTag" function 1312 creates a URL for a one-pixel resource image and then embeds in the URL, following the "?" symbol, a list of key/value pairs. The URL is contained within the symbol-string variable P which is passed to the "dcsCreateImage" routine 1314. The "dcsCreateImage" routine 1316 makes an assignment to an image variable 1318 which is processed by the browser by using an HTTP request and the URL created by the "dcsTag" routine to fetch the one-pixel image. The one-pixel image is not used for display, but is merely a vehicle for transmitting the key/value pairs encoding in the parameters within the URL to the data-collection system.

It should be noted that the data collected by the instrumentation is unstructured. The value of a key/value pair can be an arbitrary symbol string or an array of symbol strings. Multiple values may be later combined to create longer symbol strings. The data collected is specified by the instrumentation code. The data processing, query-based filtering and selection of data, and data enhancement generally take place downstream, in a processing center or other system remote from where the instrumentation is executed to collect data. There are many advantages to downstream data processing, including the ability of the processing center to emit many different types of data streams from a common collection of data, separately applying different types of queries, filtering, and enhancement to the collected data to generate separate data streams. Furthermore, the instrumentation remains simple and efficient, and does not introduce potentially disruptive computational burdens on processor-controlled user appliances. The data collected via the instrumentation is also relatively independent of the remaining system components. For example, the instrumentation may be modified to collect a new key/value pair, and that key/value automatically ends up passed to data consumers who have not chosen to filter out the key/value pairs using queries. The instrumentation can be, in many cases, modified even while the data is collected and streamed to data consumers.

Figure 14:
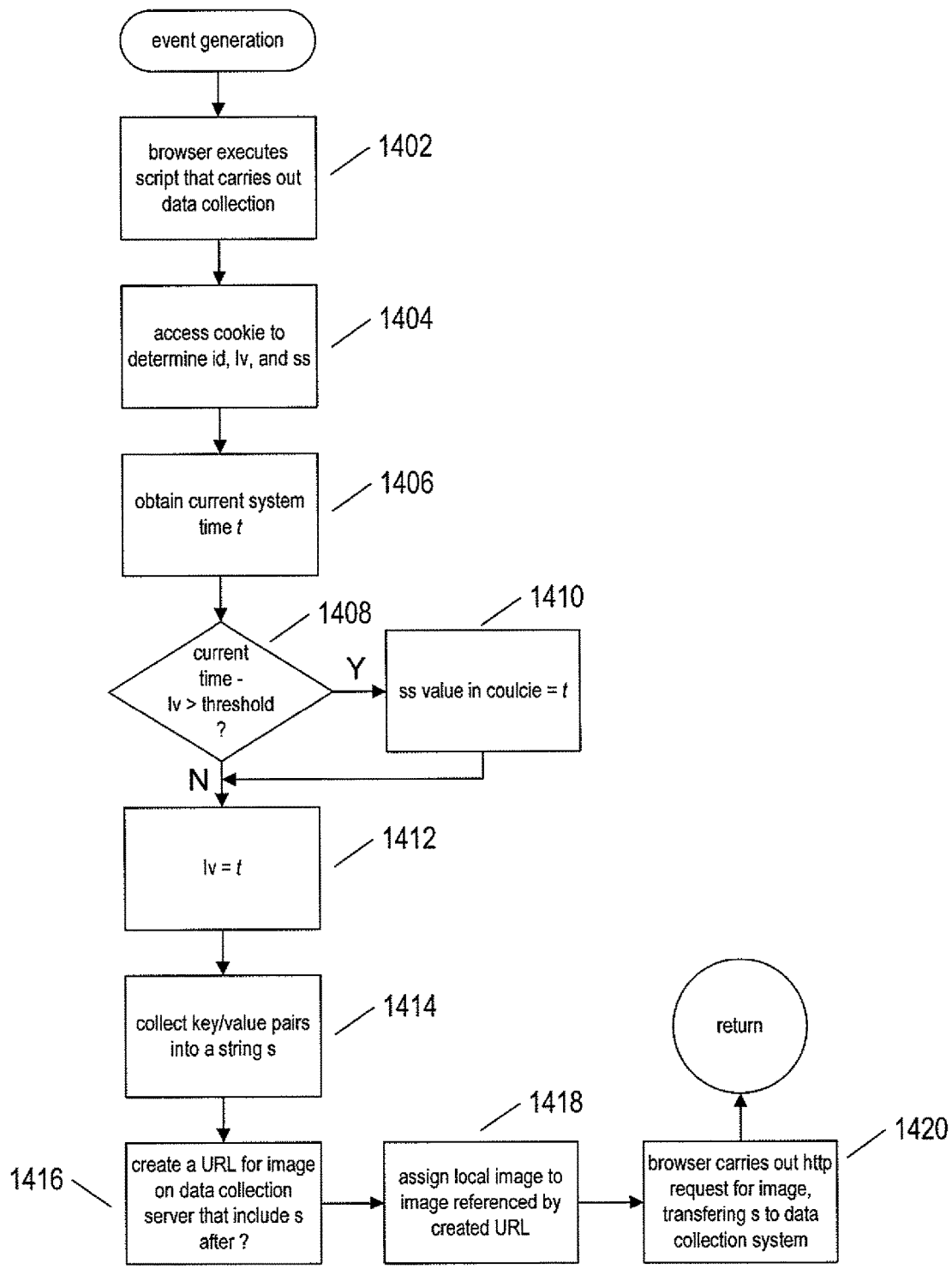
FIG. 14 provides a control-flow diagram that describes the event-generation process within the browser, discussed above with reference to FIGS. 13A-B.

FIG. 14 provides a control-flow diagram that describes the event-generation process within the browser, discussed above with reference to FIGS. 13A-B. In step 1402, the browser executes a script that carries out the data collection. In step 1404, the data-collection code accesses the cookie stored within the processor-controlled user appliance to determine the identifier, last-visit, and session-start values, id, lv, and ss, discussed above with reference to FIG. 6. In step 1406, the browser script obtains the current system time t. When the difference between the current time t and the value lv is greater than a threshold value, as determined in step 1408, then, in step 1410, the value ss stored in the cookie is set to the current system time t to indicate start of a new session. As discussed above, and further discussed below, a session is a group of events related to a particular user/processor-controlled user appliance that all occur within a specified time window. A new session begins when the difference between the current time and the last-visit time stamp is greater than the threshold value. In step 1412, the value lv is set to the current system time t and stored in the cookie. In step 1414, a set of key/value pairs that represent data collected by the instrumentation is collected and formed into a string s that is placed, following the symbol "?," into a URL created for an image resource in step 1416. In step 1418, the browser script executes an assignment or some other statement that results in the browser using an HTTP GET request to fetch the resource specified by the URL from a data-collection system, in step 1420.

Figure 15:
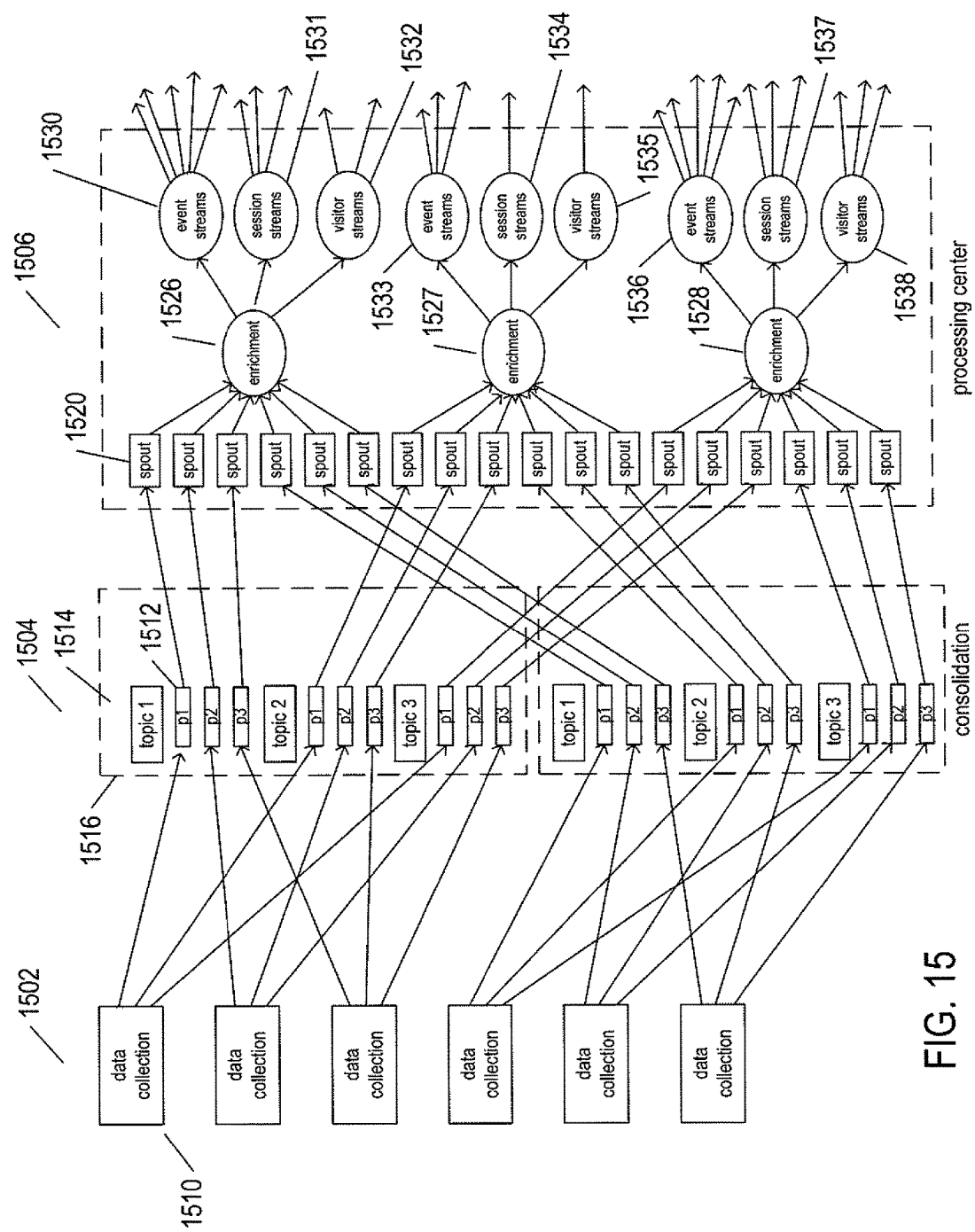
FIG. 15 illustrates one implementation of the real-time processed-data-message streaming system and methods to which the current document is directed.

FIG. 15 illustrates one implementation of the real-time processed-data-message streaming system and methods to which the current document is directed. As discussed above, the system includes a set of data-collection systems, represented by column 1502 in FIG. 15, a number of consolidation systems, represented by column 1504 in FIG. 15, and one or more processing centers, represented by column 1506 in FIG. 15. Each data-collection system, such as data-collection system 1510, transmits event messages to a particular partition within each topic of a particular consolidation system, such as partition 1512 within topic 1514 of consolidation system 1516. In general, the data-collection systems may collect data for each of multiple clients/topics. Within the processing center 1506, a spout is associated with each partition within a data-consolidation system, such as spout 1520 associated with partition 1512. The spouts pull event messages from the consolidation systems and emit them to first-level enrichment bolts 1526-1528. The enrichment bolts may carry out a coarse, general filtering and also compute and determine the various enrichment values that are added to an event message to create an enriched event message. The enriched event messages are then passed from the enrichment bolt 1526-1528 to downstream bolts 1530-1538. Each enrichment bolt 1526-1528 is associated with a particular client. Clients may receive a stream of enriched event messages from an event-streams bolt, such as event-streams bolt 1530. The event-streams bolt carries out query-based filtering specific for particular clients prior to emitting a stream of enriched event messages through open sockets to client applications. Session-stream bolts, such as session-stream bolt 1531, carry out additional processing to group data extracted from enriched event messages into session messages, and emit session messages through communications sockets to client applications. Visitor-stream bolts, such as visitor-stream bolt 1532, also aggregate and process enriched event messages to generate visitor data messages, which describe the activities of particular visitors, in real time, within a web site. Other types of bolts produce other types of processed-data messages. These other types of bolts may perform various types of data aggregation to allow a client application to display various types of aggregate and collective data representing, in general, multiple events associated with multiple web-site users.

Many other collections of component systems, organizations of component systems, and message-passing topologies may be used to produce alternative implementations of the real-time processed-data streaming system to which the current document is directed. Many different topologies may be used within the Storm distributed system for implementing enrichment, filtering, and aggregation.

Figure 16:
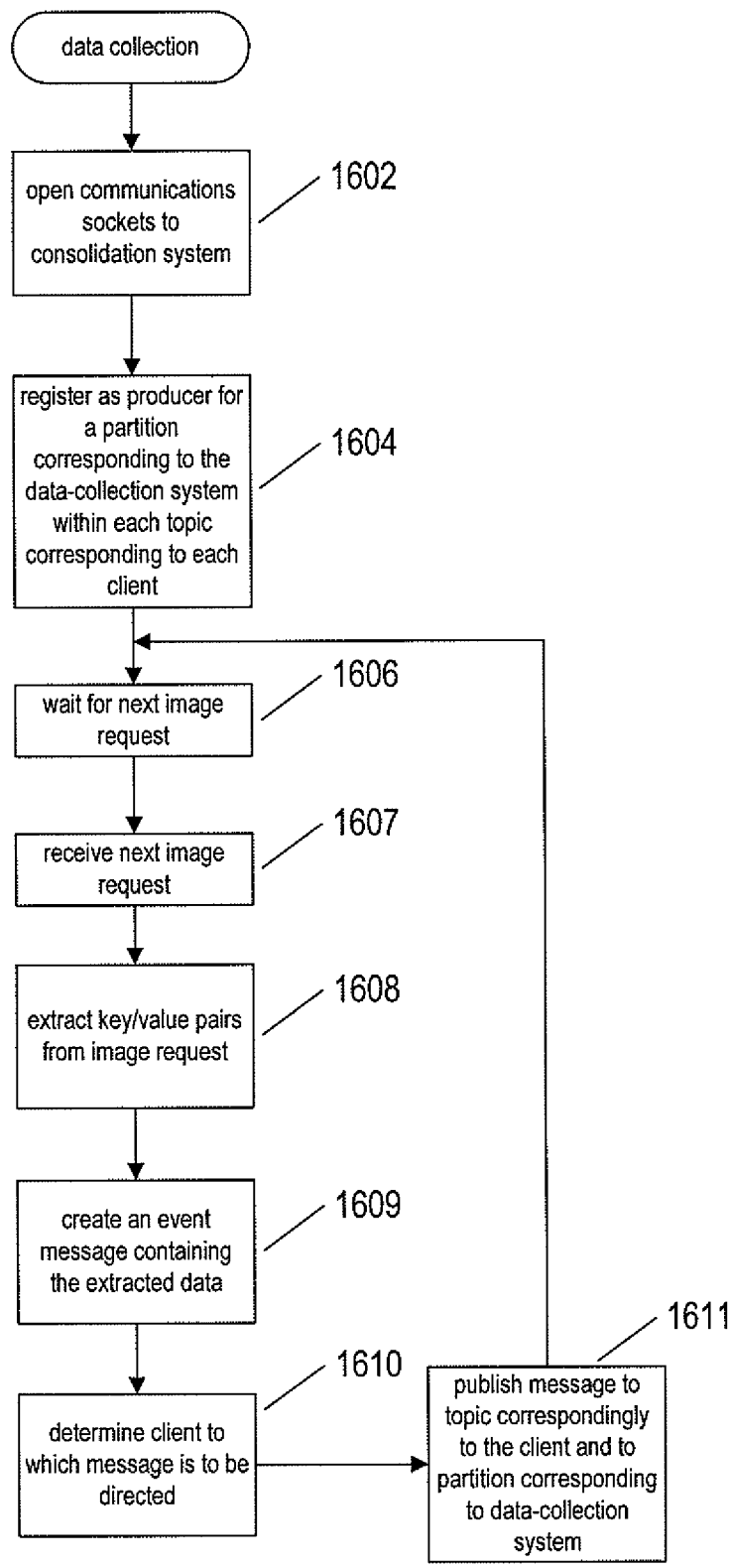
FIG. 16 illustrates operation of a data-collection system.

FIG. 16 illustrates operation of a data-collection system. In step 1602, the data-collection system opens a set of communications sockets to a consolidation system. In step 1604, the data-collection system registers as a producer for a partition corresponding to the data-collection system within each topic corresponding to each client receiving real-time processed-data-message streams. Then, in the continuous loop of steps 1606-1611, the data-collection system waits for a next image request, in step 1606, receives a next image request in step 1607, extracts the key/value pairs from the image request in step 1608, creates a JSON-encoded event message containing the extracted data in step 1609, determines, from the extracted data, the client to which the message is to be directed, in step 1610 and, in step 1611, publishes the JSON-encoded event message to the topic corresponding to the client and to the partition corresponding to the data-collection system of a consolidation system. Note that the waiting step 1606 does not imply, in this control-flow diagram, that a separate wait operation is executed prior to receiving each image request. Instead, when image requests are received continuously, batches of image requests may be processed following each wait operation, similar to the methods by which operating systems field hardware interrupts and invoke corresponding interrupt handlers.

Figure 17:
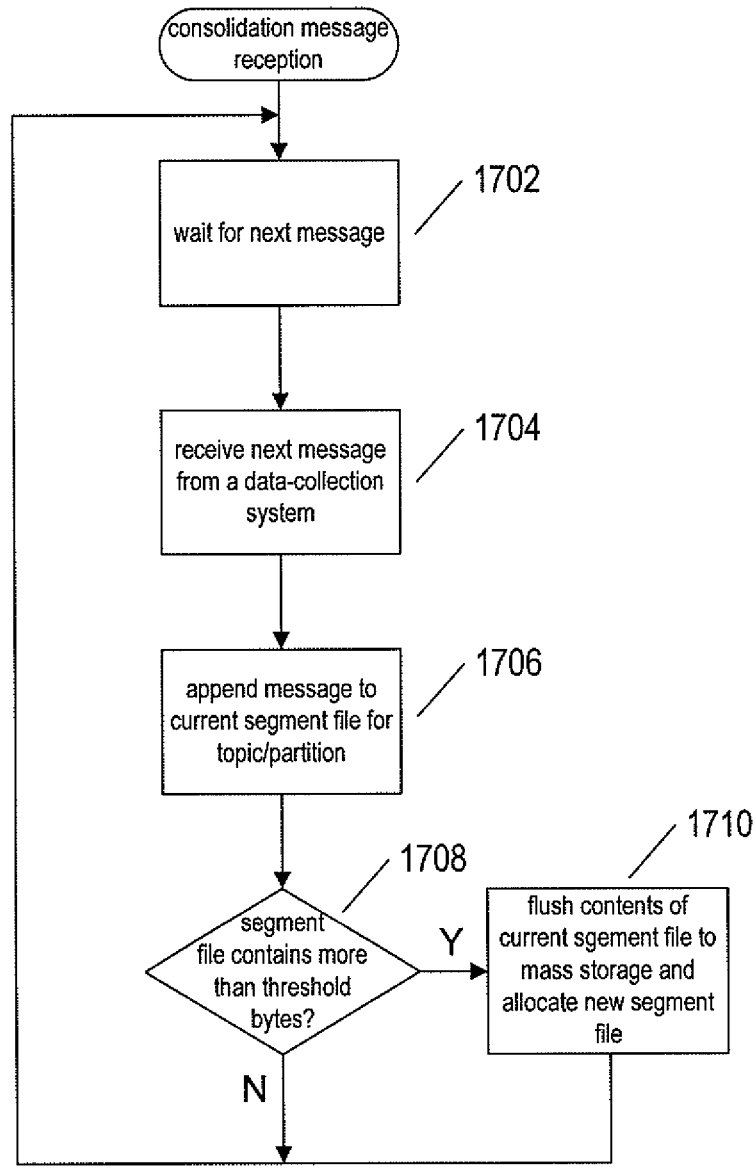
FIGS. 17-18 provide control-flow diagrams that illustrate operation of a consolidation system.
Figure 18:
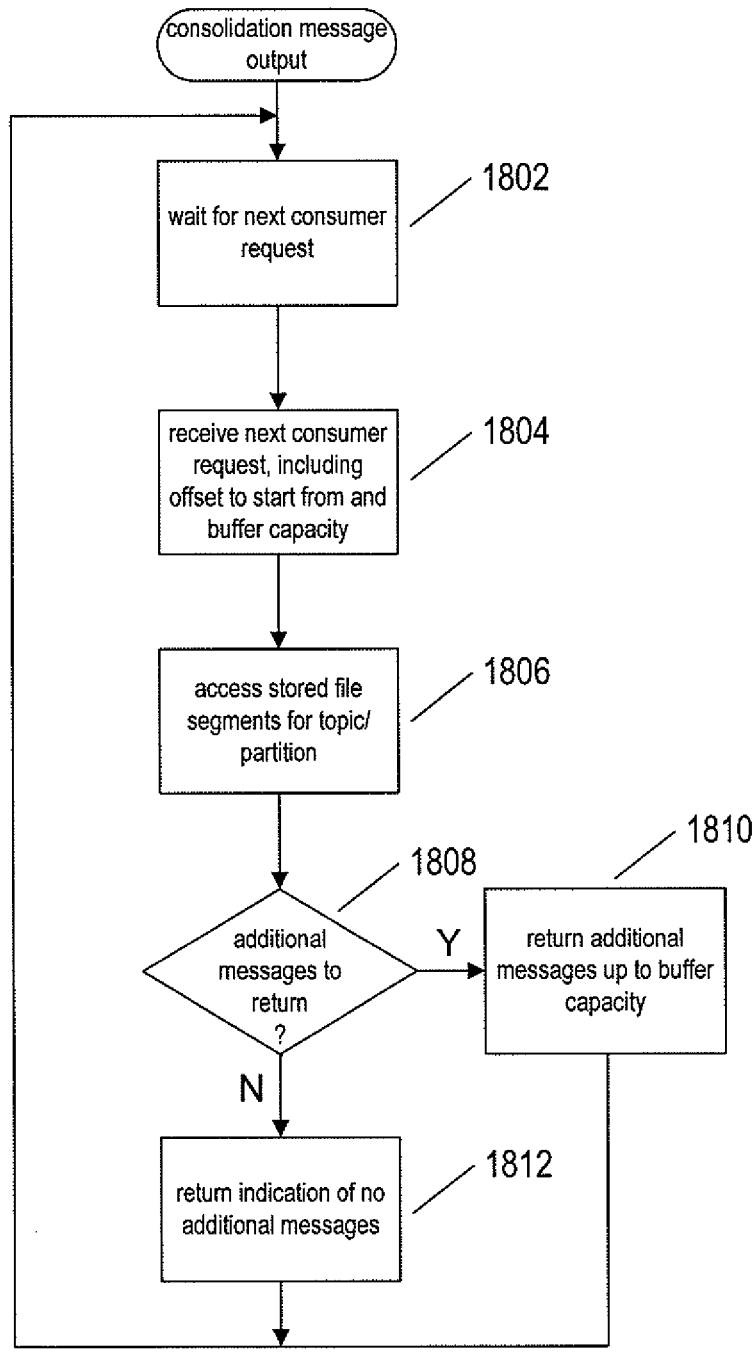

FIGS. 17-18 provide control-flow diagrams that illustrate operation of a consolidation system. FIG. 17 shows a message-reception portion of consolidation-system operation. In step 1702, the consolidation system waits for a next JSON-encoded event message from a data-collection system. Again, as with the data-collection systems, actual waiting for message-arrival events may occur only rarely when messages are received continuously by the consolidation system. In step 1704, the consolidation system receives a next JSON-encoded event message from a data-collection system. In step 1706, the consolidation-message system appends the received message to a current segment file for the topic/partition to which the message was directed. The segment file contains more than a threshold number of bytes, as determined in step 1708, and the contents of the segment file are flushed to mass storage and a new segment file allocated for reception of subsequent messages directed to the topic/partition, in step 1710.

FIG. 18 illustrates the output side of a consolidation system. In step 1802, the consolidation system waits for a next consumer request. In step 1804, a next consumer request is received. Consumer requests generally include an offset within a segment file from which to start outputting messages and a buffer capacity of the consumer for storing messages. In step 1806, the consolidation system accesses one or more stored segment files that store messages starting from the offset up to a number of successive messages that would fill the buffer capacity. When there are additional messages stored in those segment files, as determined in step 1808, then additional messages up to the buffer capacity are returned to the requesting consumer in step 1810. Otherwise, an indication of no additional messages is returned to the consumer in step 1812.

Figure 19:
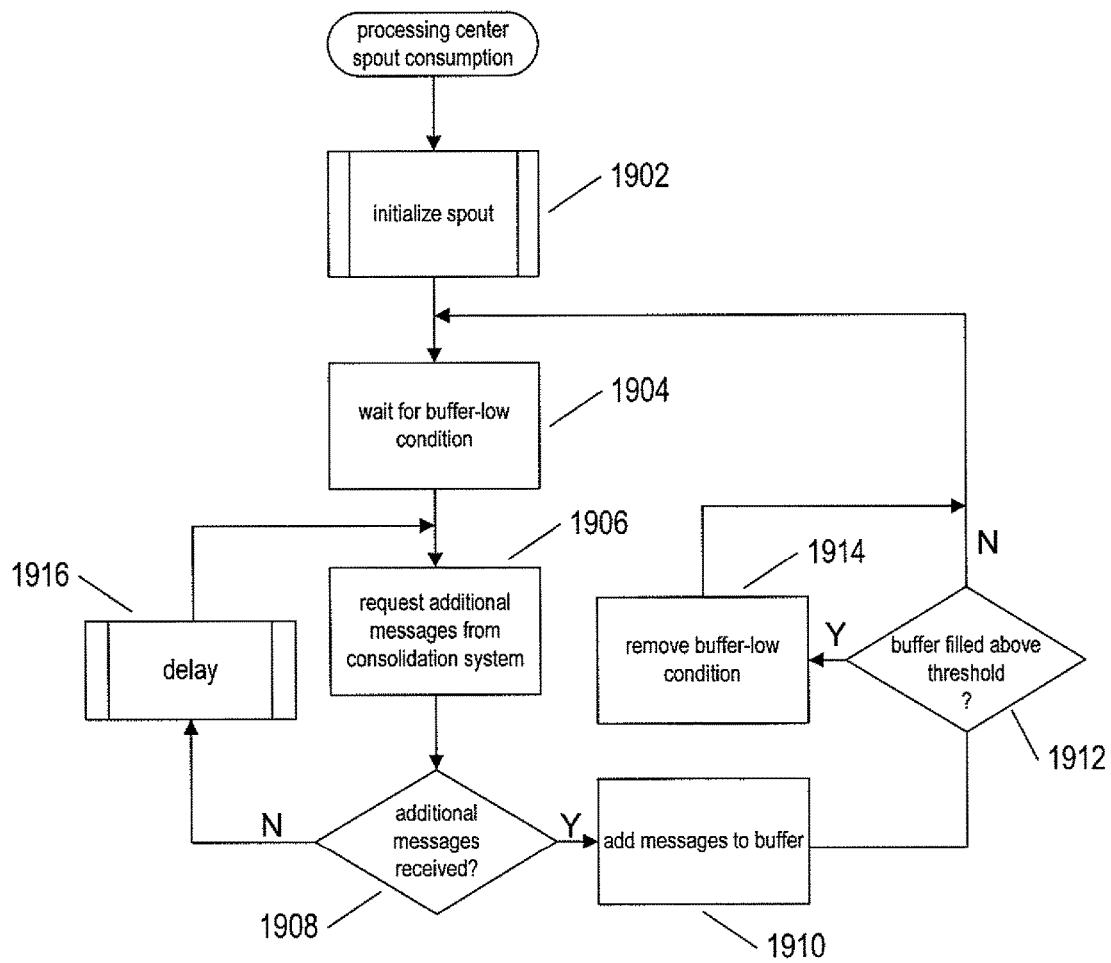
FIGS. 19-23 illustrate operation of the processing center.

FIGS. 19-23 illustrate operation of the processing center. FIG. 19 illustrates spout consumption of JSON-encoded event messages supplied by consolidation systems. In step 1902, the spout is initialized. In step 1904, the spout waits for a buffer-low condition indicating that the spout can solicit and store additional messages. In step 1906, the spout requests additional messages from the consolidation system. If additional messages are received, as determined in step 1908, then the additional messages are added to the buffer in step 1910. When the buffer now contains more than a threshold amount of data, as determined in step 1912, the buffer-low condition is removed in step 1914. When no additional messages are received, then the spout may delay, in step 1916, before again requesting messages from the consolidation system in step 1906.

Figure 20:
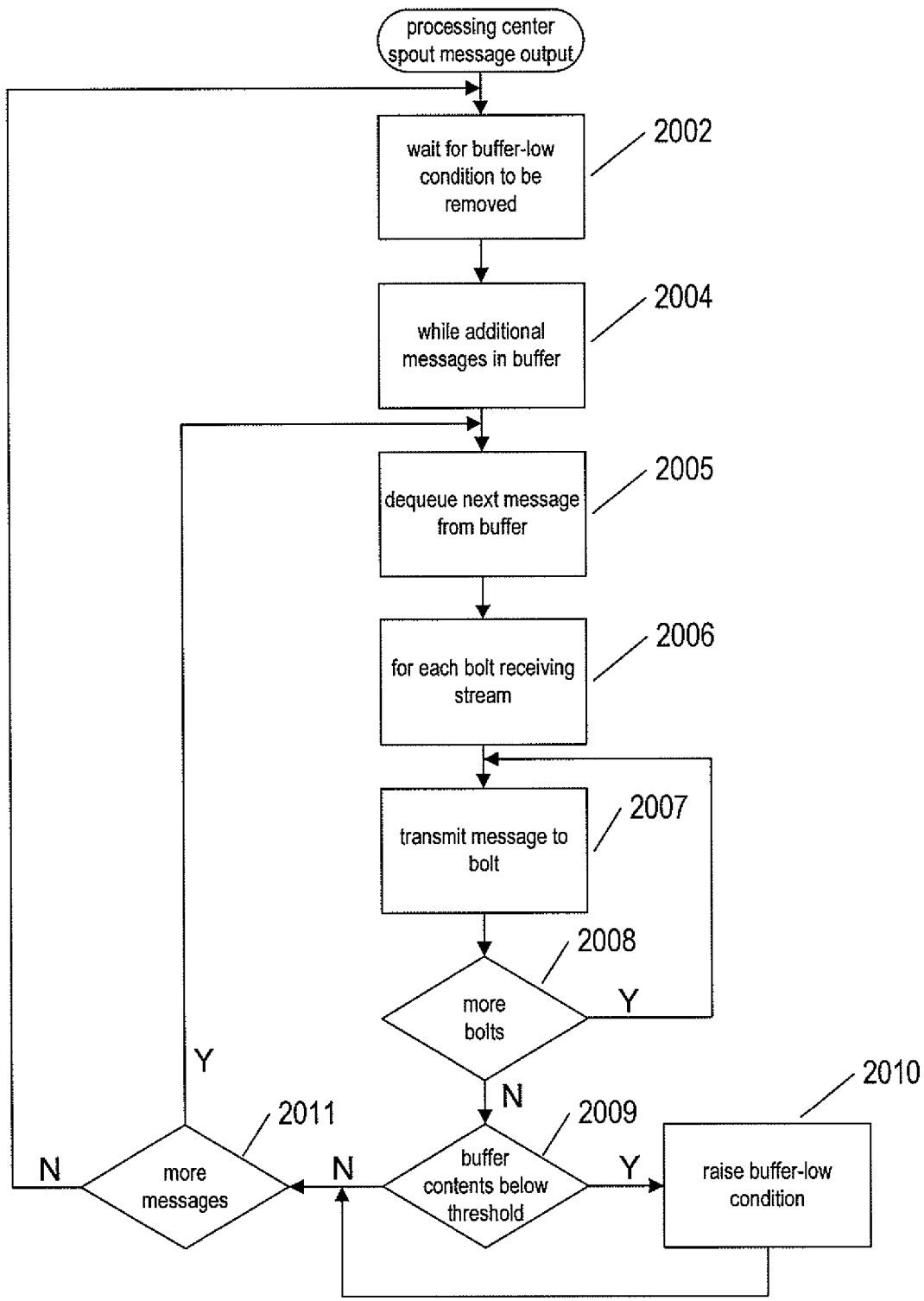

FIG. 20 illustrates the output function of the spout within a processing center. In step 2002, the spout waits for a buffer-low condition to be removed. Then, while there are additional messages in the buffer, the spout carries out the while-loop of steps 2004-2011. In step 2005, the spout dequeues the next message from the buffer and then, in the inner for-loop of steps 2006-2008, transmits the message to each bolt that receives messages from the spout. When the buffer contents are below a threshold value, after processing of the next message, as determined in step 2009, the spout raises the buffer-low condition in step 2010. When there are more messages to retrieve from the buffer, as determined in step 2011, control returns to step 2005. Otherwise, control returns to step 2002.

Figure 21:
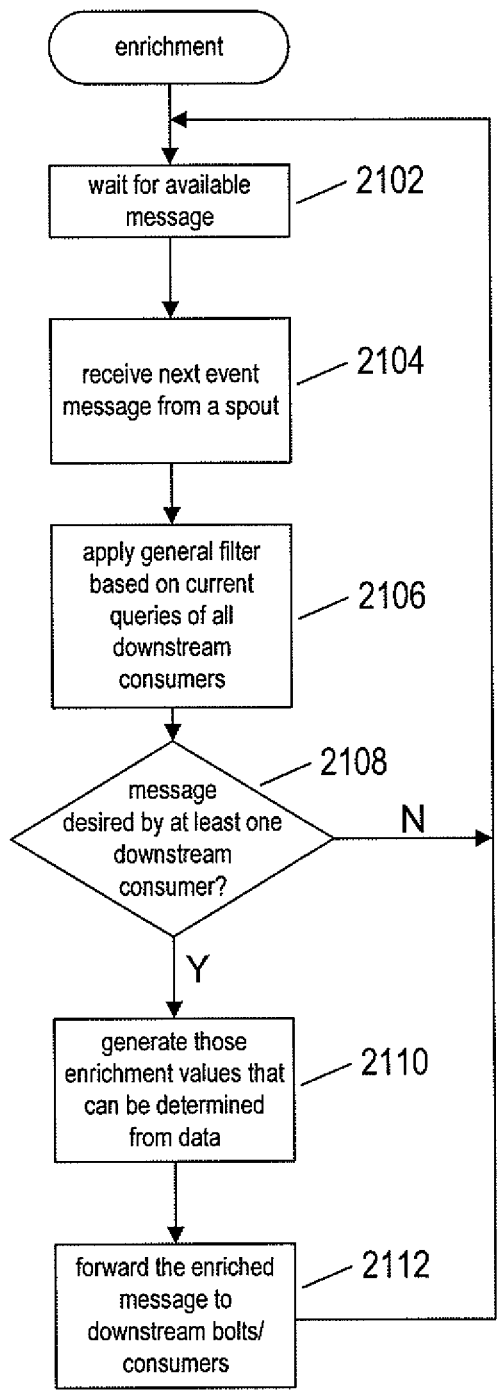

FIG. 21 illustrates operation of an enrichment bolt. In step 2102, the bolt waits for a next available message to process. In step 2104, the bolt receives the next message from a spout. In step 2106, the enrichment bolt applies a general filter based on the current queries for downstream consumers of messages emitted by the enrichment bolt in order to discard messages that would not survive downstream filtering based on specific queries. When the message is desired by at least one downstream consumer, as determined in step 2108, then, in step 2110, the enrichment bolt generates the enrichment values that can be determined from data included in the received event message as well as other sources of information and accessible to the bolt and computation undertaken by the bolt. Following enrichment, in which the generated data values are included in the "ext" object of the enrichment message, the enriched message is forwarded to downstream bolts and consumers in step 2112.

Figure 22:
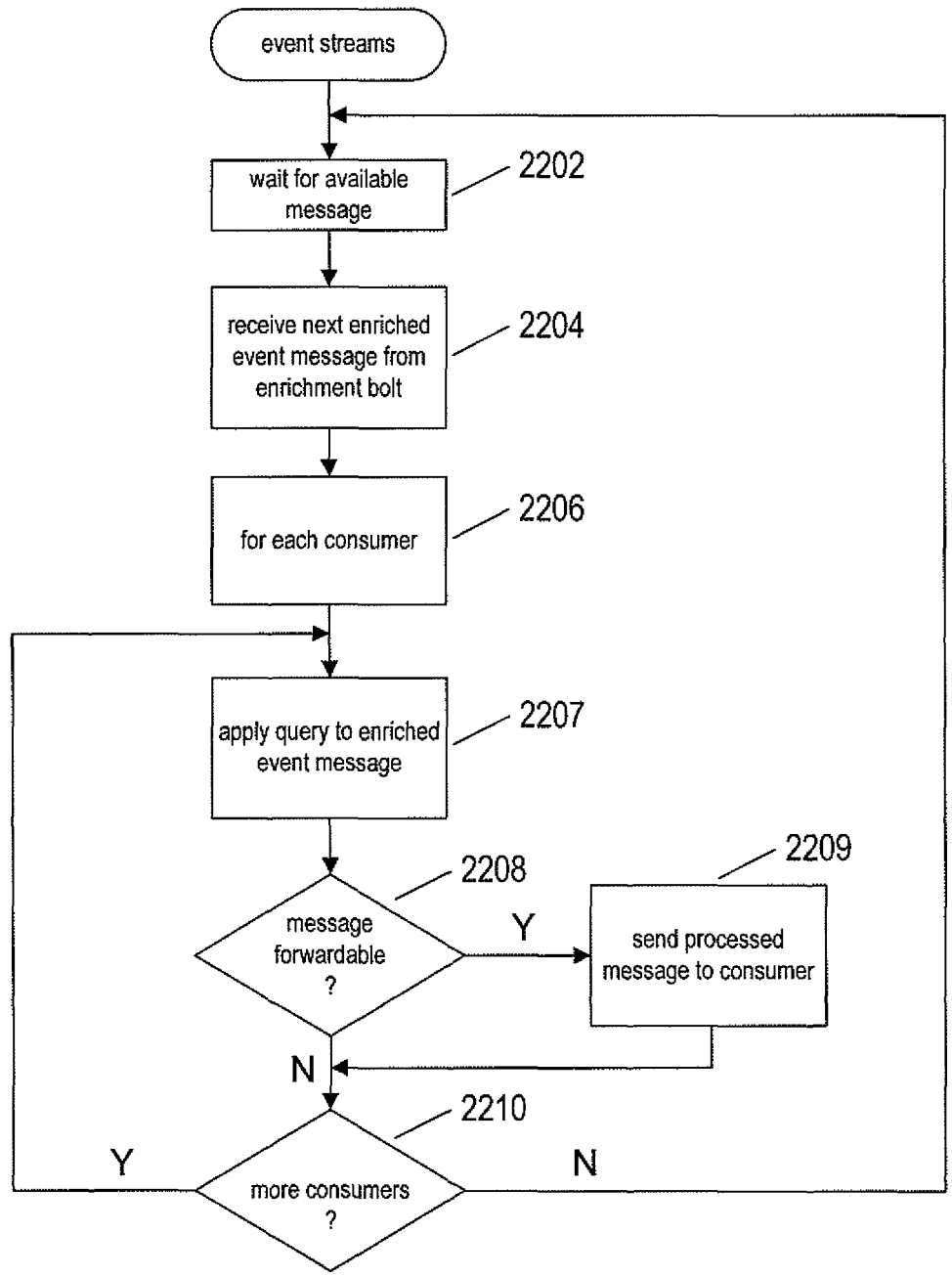

FIG. 22 illustrates operation of an event-stream bolt. In step 2202, the event-stream bolt waits for a next message from an enrichment bolt. In step 2204, the event-stream bolt receives a next enriched event message from an enrichment bolt. Then, in the for-loop of steps 2206-2210, the event-stream bolt applies a consumer-specific query for each consumer to the enriched event message, in step 2207 and, when, following application of the query, the message remains forwardable to the specific consumer, as determined in step 2208, sends the processed and filtered message to the consumer in step 2209.

As discussed above, instrumentation may be modified while data is being collected from remote processor-controlled user appliances and streamed to data consumers. When instrumentation is altered or modified within a particular remote processor-controlled user appliance to collect new types of data, as one example, and when data collection from the remote processor-controlled user appliance is resumed, the new types of data collected by the instrumentation is directed into the ongoing data-collection, data-consolidation, data-processing, and processed-data stream, without interrupting or reconfiguring the ongoing processed-data stream. In a similar fashion, a query specified by a data-consumer may be modified by the data consumer during data collection from remote processor-controlled user appliances and streaming of corresponding processed data to the data consumer. In certain implementations, an out-of-band query-modification protocol allows a data-consumer to modify a query currently being applied by the data-processing center on behalf of the data consumer. In alternative implementations, the data consumer, while receiving processed data through an initially opened socket, opens a new socket/connection to the data-processing center using a new or modified query, and, once processed begins to be received through the new socket/connection, closes the initially opened socket and a carries out, if needed, a temporary de-duplication on processed data received while both the initially opened socket and the new socket were open. This same principle applies throughout the currently disclosed real-time processed-data-message streaming system. Once instrumentation is activated on one or more remote processor-controlled user appliances, data is continuously transmitted from the one or more remote processor-controlled user appliances to one or more data-collection systems, from which the data traverses the remaining component systems of the real-time processed-data-message streaming system, finally ending up in one or more processed-data streams. Should a data-collection system be brought down for any of various reasons, data can be automatically rerouted to other or new data-collections systems. Similar considerations apply to the other systems and subsystems within the real-time processed-data-message streaming system. In a case in which all data-processing centers temporarily go offline, the data can accumulate in data-consolidation systems and can then subsequently be transferred to a data-processing center that is restarted, without data loss and with only a temporary interruption in processed-data streaming. The various functionalities within each of the components of the real-time processed-data-message streaming system may be modified, on the fly, without interrupting data collection and data streaming, providing that other systems remain functional during modification of the functionality on a particular component system.

Figure 23:
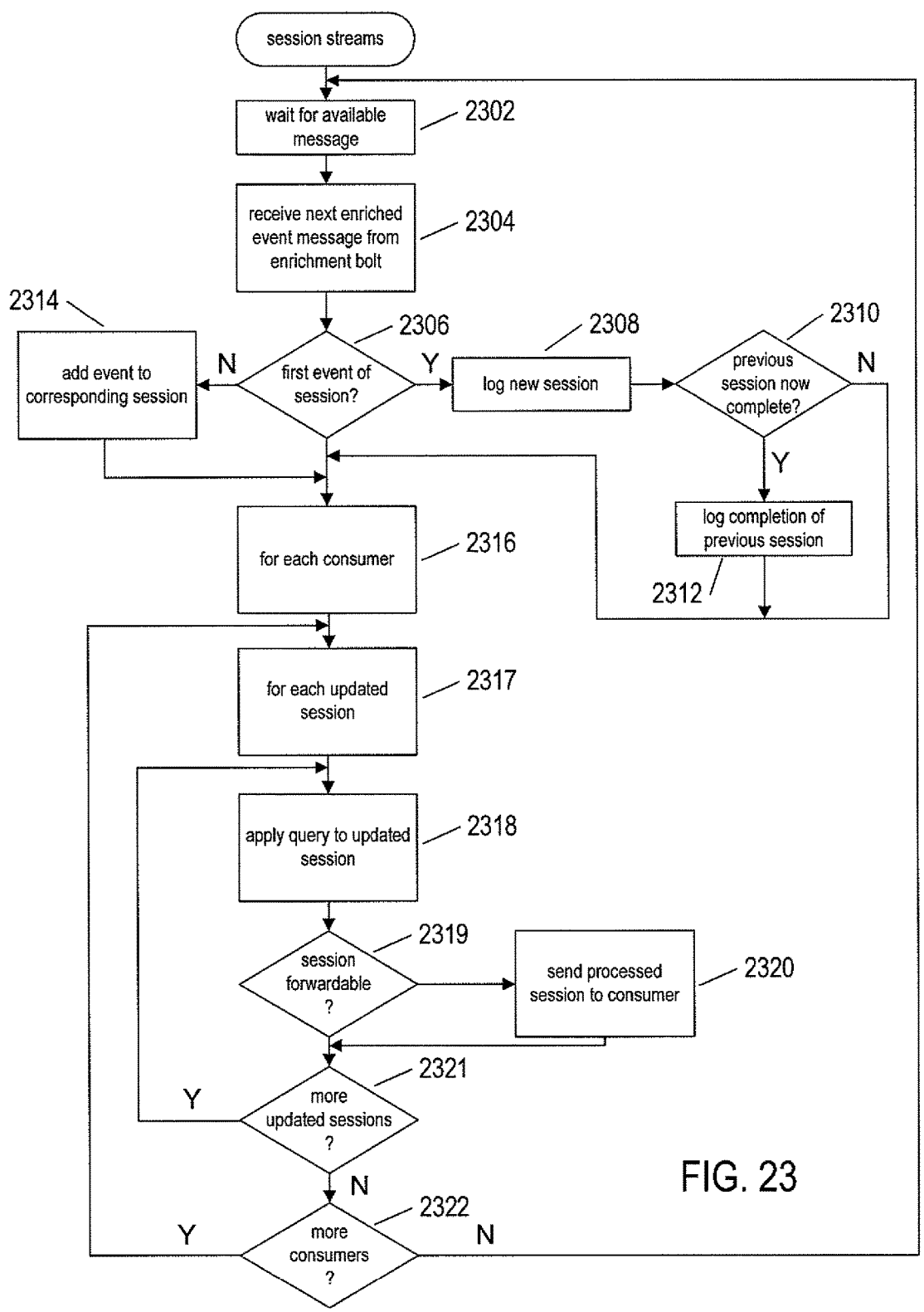

FIG. 23 provides a control-flow diagram that illustrates operation of a session-stream bolt. In step 2302, the session-stream bolt waits for a next available message from an upstream enrichment bolt. In step 2304, the session-stream bolt receives a next enriched event message from the enrichment bolt. When the enriched event message corresponds to the first event of a session, as determined in step 2306, a session-stream bolt logs a new session for the user/processor-controlled user appliance identified by the id value in step 2308. When logging of the new session results in a previous session now being complete, as determined in step 2310, completion of the previous session is logged in step 2312. Otherwise, when the received enriched event message does not correspond to the first event of a session, the data in the received enriched event message is added to a corresponding current session in step 2314. Next, in the nested for-loops of steps 2316-2322, the session-stream bolt considers each updated session currently managed by the session-stream bolt and, for each consumer of session streams, applies the consumer's query to the updated session, in step 2318, to determine, in step 2319, whether the session is forwardable to the consumer following filtering. If so, then a session message corresponding to the updated session is generated and transmitted to the consumer in step 2320. The session-stream bolt may also consider, in a separate loop, those sessions that have not been updated to detect sessions that have terminated due to the elapse of a greater than threshold amount of time, and log those sessions as complete prior to undertaking the nested for-loop of steps 2316-2322.

Figure 24:
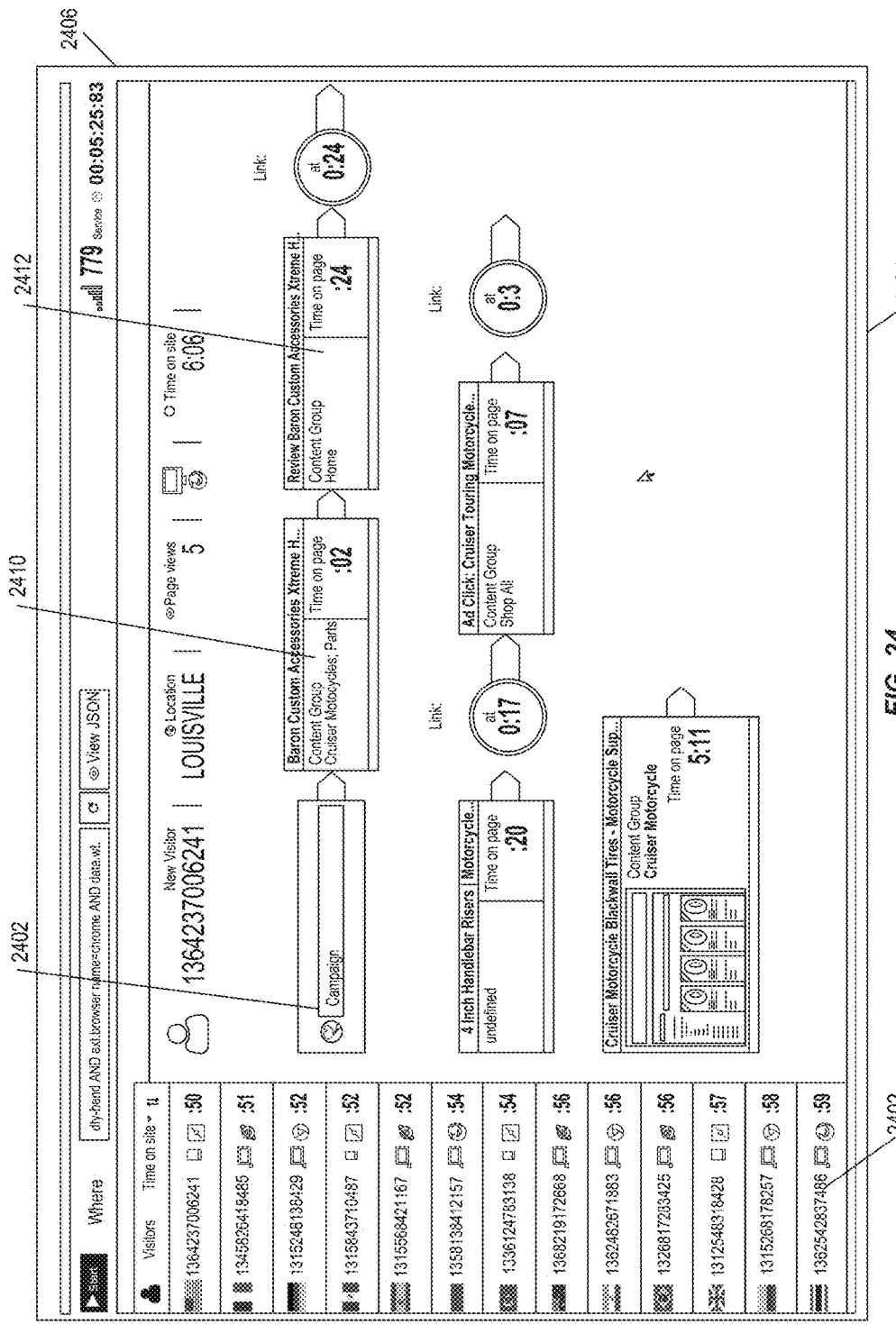
FIG. 24 shows an example monitor display for a web site that visually represents current visitors.

As discussed above, in addition to event streams and session streams, various additional types of streams may be generated by one or more bolts within the processing center and emitted to consumer applications. One such additional type of stream is a visitor stream, which provides information about each current visitor within a web site. FIG. 24 shows an example monitor display for a web site that visually represents current visitors. Current visitors are identified by ID and country in a left-hand column 2402. In a central display panel 2404, progress of a visitor through the web site is graphically illustrated for each of a subset of the current visitors. For example, timeline 2406 illustrates that a particular current visitor arrived at the web site through a campaign 2408, such as an email sent by the website owner to the visitor, initially accessed a Baron custom accessories page 2410, and then, after 24 seconds, accessed a review Baron custom accessories page 2412. A visitor-message data stream thus allows a website owner to, in real time, monitor visitor activities within a web site. This may allow the web site owner to, in real time, alter the content of the web site or produce visitor-specific information to specific visitors in order to direct the visitor to web pages, products, and services that the web site owner may believe to be most conducive for encouraging purchases, as one example.

The real-time processed-data-message streaming system and methods to which the current document is directed provide many additional opportunities for web site monitoring and dynamic adaptation. It is possible that this system and corresponding methods may provide the foundation for providing unique and completely dynamic customer-specific web-site experiences to customers. The real-time data may also provide the basis for many types of predictions and for initiation of actions and processes based on the predictions.

Next, a few examples are provided of various types of queries that provide filtered, processed data streams to support particular types of applications and other data consumers. In a first example, an application program consumes streaming data from remote processor-controlled user appliances in order to display a heat map of a web-site web page indicating the frequency of user input to each portion of the web page. In order to produce the processed-data stream for supporting the heat-map display, a heat map plugin is loaded into each of one or more remote processor-controlled user appliances. This plugin tracks mouse movements and sends coordinates of the locations of a mouse-controlled cursor and tracks mouse and/or touch events. The plugin sends the collected information to one or more data-collection systems. The real-time processed-data-message streaming system streams the information to the heat-map application, which uses the data to overlay a user-activity heat map on top of page. The data stream is filtered using a query such as:
   ANY(ext.geo.region='Oregon' and data.wt.mc_id='10001') AND data.cs-uri-stem='/products/bikes/helmets.asp'
which produces a stream of data related to visitors to a target web page where the visitor is from Oregon, the visitor arrived via Campaign ID: 10001, and the visitor is viewing and interacting with the 'helmets' page.

As another example, FACEBOOK™ application users are monitored, with information about particular types of users returned to FACEBOOK™, a monitoring subsystem, or an application-development organization to track application usage and modify or dynamically alter the FACEBOOK™ application or information used by the FACEBOOK™ application in order to best serve current FACEBOOK™ application users. In order to produce the processed-data stream for supporting the modification or dynamically alteration of the FACEBOOK™ application, a FACEBOOK™ plugin is loaded into each of one or more remote processor-controlled user appliances. This plugin asynchronously pulls FACEBOOK™ graph data to include in data sent to one or more data-collection servers and, as each FACEBOOK™ application page renders and/or each FACEBOOK™ application click event occurs, sends event and user data to one or more data-collection servers. The real-time processed-data-message streaming system streams data back to make it available for an optimization or application-development system which, in turn, ensure that subsequent FACEBOOK™ application pages offer more relevance information to particular visitors. The data stream is filtered using a query such as:

ANY(ext.source.name='Facebook' and data.wt.mc_id='10001') AND data.wt.fb.user_gender='m'

This query produces a data stream describing visitors to a target FACEBOOK™ application where the visitor arrived via Campaign ID: 10001 and the visitor is male.

As yet another example, an organization that has launched an advertising campaign on various websites tracks certain classes of web-site users who arrive at websites through the campaign, such as users who initiate product selection and purchase, but who fail to carry out a purchase. In certain cases, the organization can intervene, in real time, to provide additional information to such users to encourage them to complete transactions. Campaign efficacy for visitors using mobile device campaigns are created with specialized campaign data included on the URL used to reach a particular web site. A visitor clicks on one of these links and arrives on the web site using a mobile device and then proceeds to click on several other pages on the web site. The visitor then places an item in the visitor's shopping cart. While some visitors make purchases, other visitors abandon their shopping carts. The organization wants to optimize the campaign by understanding what is effective and what is not effective in encouraging visitors to complete purchases. The data stream is filtered using a query such as:

ANY(ext.source.name='Campaign' and process_number='1') and
ANY(data.wt.tx_e='a') and
ALL(data.wt.tx_e!='p') and session.closed='True' and ext.device.type!='Computer'

The query produces a data stream that describes visitors to a web site where the visitor's first event is noted as arriving from a Campaign, the visitor is using a mobile device, the visitor has put an item in their shopping cart, the visitor has not yet made a purchase, the visitor's visit has reached a "closed" threshold target, and the cart is considered abandoned.

While the above discussion has focused on streaming the collected and processed data to data consumers, the collected data, both prior to processing and following processing, can also be stored within the processing center for non-real time purposes, including subsequent accesses, replay of dynamic data generation by instrumented appliances, and for many other purposes. The data may be compressed for more efficient storage. In certain implementations, the data may be stored for up to a maximum storage time, after which the data may be selectively archived or deleted.

Although the present invention has been described in terms of particular embodiments, it is not intended that the invention be limited to these embodiments. Modifications within the spirit of the invention will be apparent to those skilled in the art. For example, real-time processed-data-message streaming systems may be implemented in various different ways by varying any of many different design and implementation parameters, including the types and organizations of component systems and subsystems, the type of hardware, operating systems, and other components, programming language, modular organization of code, data structures, control structures, and a wealth of additional design and implementation parameters. The real-time processed-data-message streaming systems can be used to support any of a wide variety of different types of stream-consuming applications, including console-display and monitor-display applications discussed above. Furthermore, the real-time processed-data-message streaming systems and services may allow for creating highly dynamic web sites that provide different information and experiences to each of many different individual users and consumers.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A system for generating data streams representing characteristic of user interactions, the system comprising:
   a data-collection system, comprising one or more first processors and one or more first memories, the one or more first memories containing first instructions which when executed on the one or more first processors, cause the one or more first processors to perform first actions including:
   receiving, by the data-collection system, a set of event messages from one or more user devices, each event message of the set of event messages including a uniform resource locator (URL) and having been generated at least in part by execution of instrumentation by the one or more user devices, the instrumentation including a monitoring script having been inserted into a code underlying an operation of an application comprising one of a webpage, software application or control program, wherein execution of the instrumentation is configured to:
   detect a current time associated with a current instance of user interaction with an application;
   detect a previous time associated with a previous instance of user interaction with the application;
   determine that a difference between the current time and the previous time exceeds a threshold;
   upon determining that the difference between the current time and the previous time exceeds a threshold sending an interrupt to an operating system of the one or more user devices to trigger execution of the monitoring script, the monitoring script configured to record data representing the current instances of user interaction;
   encode the data representing the current instance of user interaction into a URL, the data including one or more interaction key/value pairs, each interaction key/value pair of the one or more interaction key/value pairs including an interaction value representing a characteristic of the current instances of user interaction; and request that a browser retrieve a remote resource specified by the URL via transmitting the URL;

generating, by the data-collection system, a set of events by, for each event message of the set of event messages:

extracting one or more interaction key/value pairs from the URL;

defining an event of the set of events to include the one or more interaction key/value pairs; and encoding each event of the set of events in a binary object notation, the binary object notation is configured to serialize each event of the set of events prior to transmission;

transmitting the set of events to a consolidation system;

the consolidation system, comprising one or more second processors and one or more second memories, the one or more second memories containing second instructions which when executed on the one or more second processors, cause the one or more second processors to perform second actions including:

receiving, by the consolidation system, the set of events encoded in the binary object notation;

buffering, by the consolidation system, the set of events at a temporary storage for up to a specified duration of time;

detecting, by the consolidation system, a request for event data;

in response to the request, transmitting, by the consolidation system, the set of events to a processing center;

a processing center, comprising one or more third processors and one or more third memories, the one or more third memories containing third instructions which when executed on the one or more third processors, cause the one or more third processors to perform third actions including:

generating, by the processing center, a set of enriched events by, for each event of the set of events:

identifying, by the processing center, a new value based on a calculation or extraction using the event; and defining, by the processing center, an enriched event of the set of enriched events to include at least one of one or more interaction key/value pairs in the event and the new value;

performing, by the processing center, for each enriched event in the set of enriched events, a query-based filtering of the enriched events such that each value of the one or more interaction values and the new value included in a resultant filtered event corresponds to one or more event constraints associated with a client; and transmitting, by the processing center, the filtered events in a data stream to a data consumer.

2. The system for generating data streams representing characteristics of user interactions of claim 1, wherein the data-collection system includes a plurality of independent devices, each device of the plurality of independent devices include at least one processor of the one or more first processors and at least one memory of the one or more first memories, the at least one memory containing the first instructions which when executed on the at least one processor, cause the at least one processor to perform the first actions.

3. The system for generating data streams representing characteristics of user interactions of claim 1, wherein, for each enriched event in the set of enriched events, a delay variable indicates a first time at which corresponding data was encoded by the data-collection system and a second time at which the enriched event was transmitted in the data stream to the data consumer, and wherein an average of the delay variables across the set of enriched events is less than 2.0 seconds.

4. The system for generating data streams representing characteristics of user interactions of claim 1, wherein for each enriched event in the set of enriched events, a delay variable indicates a first time at which corresponding data was encoded by the data-collection system and a second time at which the enriched event was transmitted in the data stream to the data consumer, and wherein an average of the delay variables across the set of enriched events is less than 1.0 seconds.

5. The system for generating data streams representing characteristics of user interactions of claim 1, wherein, for each interaction key/value pair of the one or more interaction key/value pairs encoded into the URL, the interaction key/value pair includes:

a key composed of a symbol string having one or more symbols; and a value composed of a symbol string having one or more symbols.

6. The system for generating data streams representing characteristics of user interactions of claim 1, wherein each event message of the set of event messages includes unstructured data including corresponding one or more interaction key/value pairs, and wherein the generating the set of enriched events includes applying a schema-based encoding.

7. The system for generating data streams representing characteristics of user interactions of claim 1, wherein the code underlying the operation of a webpage or software application into which the monitoring script is inserted includes one or more of:

executable application-program instructions that encode an application program; and one or more HTML files.

8. The system for generating data streams representing characteristics of user interactions of claim 1, wherein the data-collection system receives the set of event messages from the one or more use devices via the Internet.

9. The system for generating data streams representing characteristics of user interactions of claim 1, wherein each event message of the set of event messages includes:

a meta object that includes one or more meta key/value pairs; and a data object that includes one or more interaction key/value pairs, each interaction key/value pair of the one or more interaction key/value pairs including an interaction value representing a characteristic of a user interaction.

10. The system for generating data streams representing characteristics of user interactions of claim 1, wherein:

for each event message in the set of event messages, the event message includes an interaction key/value pair;

an interaction key of the interaction key/value pair is a symbol string having one or more symbols; and an interaction value of the interaction key/value pair is:

a symbol string having one or more symbols;

an array of one or more symbol strings, each symbol string in the array of one or more symbol strings having one or more symbols; or an object that includes one or more key/value pairs.

11. The system for generating data streams representing characteristics of user interactions of claim 9, wherein the meta object includes:

a meta key/value pair representing a schema version;

a meta key/value pair representing an application-program-interface version;

a meta key/value pair representing a message type; or a meta key/value pair representing a stream type.

12. The system for generating data streams representing characteristics of user interactions of claim 1, wherein identifying the new value indicates a geographical location of a user device associated with detected interaction characterized in the event message.

13. The system for generating data streams representing characteristics of user interactions of claim 1, wherein the data consumer is one of:

an application program running on a computer system;

an automated decision system;

an automated information-distribution system; and an automated control system.

14. The system for generating data streams representing characteristics of user interactions of claim 1, wherein the instrumentation is configured to be modifiable while detecting user interaction and encoding data.

15. The system for generating data streams representing characteristics of user interactions of claim 1, wherein identifying the new value characterizes or identifies a device type or program associated with detected interaction characterized in the event message.

16. A method for generating data streams representing characteristic of user interactions, the method comprising:

receiving, by a data-collection system, a set of event messages from one or more user devices, each event message of the set of event messages including a uniform resource locator (URL) and having been generated at least in part by execution of instrumentation by the one or more user devices, the instrumentation including a monitoring script having been inserted into a code underlying an operation of an application comprising one of a webpage, software application or control program, wherein execution of the instrumentation is configured to:

detect a current time associated with a current instance of user interaction with an application;

detect a previous time associated with a previous instance of user interaction with the application;

determine that a difference between the current time and the previous time exceeds a threshold;

upon determining that the difference between the current time and the previous time exceeds a threshold sending an interrupt to an operating system of the one or more user devices to trigger execution of the monitoring script, the monitoring script configured to record data representing the current instance of user interaction;

encode data representing the current instance of user interaction into a URL the data including one or more interaction key/value pairs, each interaction key/value pair of the one or more interaction key/value pairs including an interaction value representing a characteristic of the current instance of user interaction; and request that a browser retrieve a remote resource specified by the URL via transmitting the URL to a processing center;

generating a set of events by, for each event message of the set of event messages:

extracting one or more interaction key/value pairs from the URL;

defining an event of the set of events to include the one or more interaction key/value pairs; and encoding each event of the set of events in a binary object notation, the binary object notation being configured to serialize each event of the set of events prior to transmission;

transmitting, by a data collection system, the set of events to consolidation system;

buffering, by the consolidation system, the set of events at a temporary storage for up to a specified duration of time;

detecting, by the consolidation system, a request for event data;

retrieving the set of events from the temporary storage; and transmitting, by the consolidation system, the event data to a processing center;

generating, by the processing center, a set of enriched events by, for each event of the set of events:

identifying a new value based on a calculation or extraction using the event;

defining an enriched event of the set of enriched events to include at least one of one or more interaction key/value pairs in the event and the new value;

performing, by the processing center and for each enriched event in the set of enriched events, a query-based filtering of the enriched events such that each value of the one or more interaction values and the new value included in a resultant filtered event corresponds to one or more event constraints associated with a client; and transmitting the filtered events in a data stream to a data consumer.

17. The method for generating data streams representing characteristics of user interactions of claim 16, wherein, for each enriched event in the set of enriched events, a delay variable indicates a first time at which corresponding data was encoded by the data-collection system and a second time at which the enriched event was transmitted in the data stream to the data consumer, and wherein an average of the delay variables across the set of enriched events is less than 2.0 seconds.

18. The method for generating data streams representing characteristics of user interactions of claim 16, wherein each event message of the set of event messages includes unstructured data including corresponding one or more interaction key/value pairs, and wherein the generating the set of enriched events includes applying a schema-based encoding.

19. The method for generating data streams representing characteristics of user interactions of claim 16, wherein identifying the new value characterizes or identifies:

a geographical location of a user device associated with detected interaction characterized in the event message; or a device type or program associated with detected interaction characterized in the event message.

* * * * *

UNITED STATES PATENT AND TRADEMARK OFFICE
CERTIFICATE OF CORRECTION

PATENT NO. : 9,961,025 B2
APPLICATION NO. : 13/868269
DATED : May 1, 2018
INVENTOR(S) : Butler et al.

It is certified that error appears in the above-identified patent and that said Letters Patent is hereby corrected as shown below:

In the Specification

In Column 11, Line 52, delete "tarn," and insert -- turn, --, therefor.

In Column 12, Line 25, delete "1904," and insert -- 1 904, --, therefor.

In Column 13, Line 5, delete "1013" and insert -- 10B --, therefor.

In Column 20, Line 65, after "to" insert -- the --.

Signed and Sealed this
Second Day of March, 2021

Drew Hirshfeld
*Performing the Functions and Duties of the
Under Secretary of Commerce for Intellectual Property and
Director of the United States Patent and Trademark Office*